US012767261B2

(12) United States Patent
Shahana et al.

(10) Patent No.: US 12,767,261 B2
(45) Date of Patent: Oct. 20, 2026

(54) HUMAN-POWERED VEHICLE CONTROL DEVICE

(71) Applicant: Shimano Inc., Sakai (JP)

(72) Inventors: Satoshi Shahana, Sakai (JP); Mitsuhiko Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 847 days.

(21) Appl. No.: 17/576,153

(22) Filed: Jan. 14, 2022

(65) Prior Publication Data

US 2022/0242514 A1 Aug. 4, 2022

(30) Foreign Application Priority Data

Jan. 29, 2021 (JP) ................................ 2021-013982

(51) Int. Cl.

| | |
|---|---|
| ***B62J 45/20*** | (2020.01) |
| ***B62J 1/08*** | (2006.01) |
| ***B62J 45/412*** | (2020.01) |
| ***B62J 45/414*** | (2020.01) |
| ***B62K 25/04*** | (2006.01) |
| ***B62M 6/50*** | (2010.01) |
| ***B62M 9/06*** | (2006.01) |
| ***B62M 25/08*** | (2006.01) |
| *B62M 9/00* | (2006.01) |

(52) U.S. Cl.

CPC ................. *B62J 45/20* (2020.02); *B62J 1/08* (2013.01); *B62J 45/412* (2020.02); *B62J 45/414* (2020.02); *B62K 25/04* (2013.01); *B62M 6/50* (2013.01); *B62M 9/06* (2013.01); *B62M 25/08* (2013.01); *B62J 2001/085* (2013.01); *B62K 2025/045* (2013.01); *B62M 2009/007* (2013.01)

(58) Field of Classification Search

CPC ........ B62J 45/20; B62J 45/412; B62J 45/414; B62J 1/08; B62J 2001/085; B62K 25/04; B62K 2025/045

See application file for complete search history.

(56) References Cited

U.S. PATENT DOCUMENTS

| | | | | |
|---|---|---|---|---|
| 8,202,182 | B2 | 6/2012 | Ishikawa et al. | |
| 9,377,089 | B2 | 6/2016 | Yamaguchi et al. | |
| 10,906,608 | B2 * | 2/2021 | Nishino .................... | B60T 8/00 |
| 11,059,543 | B2 * | 7/2021 | Ichida ...................... | B62M 6/45 |

(Continued)

FOREIGN PATENT DOCUMENTS

| | | | |
|---|---|---|---|
| CN | 111942513 | A | 11/2020 |
| DE | 10 2010 017 412 | A1 | 12/2011 |
| DE | 10 2019 106 589 | A1 | 9/2019 |

(Continued)

*Primary Examiner* — Valentin Neacsu
*Assistant Examiner* — Michael R Stabley
(74) *Attorney, Agent, or Firm* — Spencer Fane, LLP

(57) ABSTRACT

A human-powered vehicle control device is a control device of a human-powered vehicle. The human-powered vehicle control device includes an electronic controller configured to control an electric component that is different from a motor providing a propelling force to the human-powered vehicle and that is provided in the human-powered vehicle. The electric component is controlled in accordance with a total driving force including a human-power driving force applied to a drive train of the human-powered vehicle and an assistance force by the motor.

15 Claims, 16 Drawing Sheets

(56) References Cited

U.S. PATENT DOCUMENTS

| | | | | |
|---|---|---|---|---|
| 2018/0178883 | A1 * | 6/2018 | Ichida | B62J 45/20 |
| 2021/0031872 | A1 * | 2/2021 | Shahana | B62M 9/123 |

FOREIGN PATENT DOCUMENTS

| | | | | | |
|---|---|---|---|---|---|
| JP | 10-194185 | A | | 7/1998 | |
| JP | 3054268 | B2 | | 4/2000 | |
| JP | 2007161219 | A | * | 6/2007 | B62M 6/50 |
| JP | 5442814 | B2 | | 12/2013 | |
| JP | 2018-103797 | A | | 7/2018 | |
| JP | 2020-97340 | A | | 6/2020 | |

* cited by examiner

HUMAN-POWERED VEHICLE CONTROL DEVICE

CROSS-REFERENCE TO RELATED APPLICATIONS

This application claims priority to Japanese Patent Application No. 2021-013982, filed on Jan. 29, 2021. The entire disclosure of Japanese Patent Application No. 2021-013982 is hereby incorporated herein by reference.

BACKGROUND

Technical Field

The present disclosure generally relates to a human-powered vehicle control device for a human-powered vehicle.

Background Information

Japanese Patent Application Laid-Open No. H10-194185 (Patent Literature 1) discloses a control device that controls an electric component mounted on a human-powered vehicle in accordance with human-power driving force.

SUMMARY

An object of the present disclosure is to provide a control device that is capable of contributing to comfortable traveling of a human-powered vehicle including an electric component.

A human-powered vehicle control device according to a first aspect of the present disclosure is a human-powered vehicle control device of a human-powered vehicle including: an electronic controller configured to control an electric component that is different from a motor providing a propelling force to the human-powered vehicle and that is provided in the human-powered vehicle, in accordance with a total driving force including a human-power driving force applied to a drive train of the human-powered vehicle and an assistance force by the motor.

In accordance with the human-powered vehicle control device according to the first aspect, the electronic controller controls an electric component in accordance with a total driving force including an assistance force by the motor in addition to a human-power driving force, so that the electronic controller is capable of controlling the electric component so as to adapt to a traveling state of the human-powered vehicle. Thus, the human-powered vehicle control device is capable of contributing to comfortable traveling of the human-powered vehicle.

In the human-powered vehicle control device of a second aspect according to the first aspect, the electronic controller is further configured to control the motor in accordance with the total driving force and a predetermined threshold.

In accordance with the human-powered vehicle control device according to the second aspect, the electronic controller further controls the motor that provides a propelling force to the human-powered vehicle, in accordance with a total driving force including an assistance force by the motor in addition to a human-power driving force, so that the electronic controller is capable of controlling the motor so as to adapt to a traveling state of the human-powered vehicle. Thus, the human-powered vehicle control device is capable of contributing to comfortable traveling of the human-powered vehicle.

In the human-powered vehicle control device of a third aspect according to the second aspect, the electronic controller is further configured to have a plurality of operation states whose maximum values of the assistance force by the motor are different from each other, and the predetermined threshold is different for each of the plurality of operation states.

In accordance with the human-powered vehicle control device according to the third aspect, the electronic controller selects one from among plurality of operation states whose maximum values of assistance force by the motor are different from each other, in accordance with the total driving force, so that it is possible to control the motor so as to provide an appropriate propelling force to the human-powered vehicle.

In the human-powered vehicle control device of a fourth aspect according to the second or the third aspect, the electric component includes a transmission, and the electronic controller is further configured to control the transmission such that a transmission ratio of the transmission reduces upon determining the total driving force is equal to or more than the predetermined threshold.

In accordance with the human-powered vehicle control device according to the fourth aspect, if a total driving force is equal to or more than the predetermined threshold, the electronic controller controls the transmission such that a transmission ratio reduces, so that it is possible to reduce load of a rider.

In the human-powered vehicle control device of a fifth aspect according to the second or the third aspect, the electric component includes a transmission, and the electronic controller is further configured to control the transmission such that a transmission ratio of the transmission reduces upon determining a peak value of the total driving force changes from increasing to decreasing is continuously equal to or more than the predetermined threshold for a predetermined first number of times.

In accordance with the human-powered vehicle control device according to the fifth aspect, if a peak value of the total driving force in changing from increasing to decreasing is continuously equal to or more than predetermined threshold for a predetermined first number of times, the electronic controller controls the transmission such that a transmission ratio reduces, so that it is possible to reduce load of a rider while reducing unnecessary speed changing.

In the human-powered vehicle control device of a sixth aspect according to any one of the first to the fifth aspects, the electric component includes a transmission, and the electronic controller is further configured to periodically acquire information related to an acceleration in an advancing direction of the human-powered vehicle; and the electronic controller is further configured to control the transmission such that a transmission ratio of the transmission reduces upon determining the acceleration in the advancing direction of the human-powered vehicle does not continuously increase for a predetermined second number of times.

In accordance with the human-powered vehicle control device according to the sixth aspect, in a case where an acceleration in an advancing direction of the human-powered vehicle does not continuously increase for the predetermined second number of times, the electronic controller controls the transmission such that a transmission ratio reduces, so that it is possible to reduce load of a rider while reducing unnecessary speed changing.

In the human-powered vehicle control device of a seventh aspect according to any one of the fourth to the sixth aspects, the electronic controller is further configured to control the transmission such that the transmission ratio does not reduce in accordance with the total driving force upon determining a traveling velocity of the human-powered vehicle is outside of a predetermined range.

In accordance with the human-powered vehicle control device according to the seventh aspect, the electronic controller is capable of controlling, if a traveling speed of the human-powered vehicle is out of a predetermined range, the transmission such that the transmission ratio does not reduce in accordance with the total driving force, so that it is possible to prevent reduction in a transmission ratio in a state where reduction in a transmission ratio is useless.

In the human-powered vehicle control device of an eighth aspect according to any one of the fourth to the seventh aspects, the human-powered vehicle includes a crank into which the human-power driving force is input, and the electronic controller is further configured to control the transmission such that the transmission ratio does not reduce upon determining a rotational speed of the crank exceeds a predetermined rotational speed.

In accordance with the human-powered vehicle control device according to the eighth aspect, in a case where a rotational speed of the crank exceeds a predetermined rotational speed, the electronic controller controls the transmission such that the transmission ratio does not reduce, so that it is possible to prevent reduction in a transmission ratio in a state where reduction in a transmission ratio is useless. Thus, the human-powered vehicle control device is capable of contributing to comfortable traveling of the human-powered vehicle.

In the human-powered vehicle control device of a ninth aspect according to any one of the fourth to the eighth aspects, the electronic controller is further configured to control the transmission such that the transmission ratio does not increase until a predetermined time interval has elapsed after controlling the transmission such that the transmission ratio reduces.

In accordance with the human-powered vehicle control device according to the ninth aspect, the electronic controller is capable of controlling the transmission so as not to uselessly repeat reduction and increase in a transmission ratio.

In the human-powered vehicle control device of a tenth aspect according to any one of the second to the ninth aspects, the electric component includes at least one of a front suspension and a rear suspension.

In accordance with the human-powered vehicle control device according to the tenth aspect, the electronic controller is capable of controlling at least one of the front suspension and the rear suspension to be in an appropriate state, in accordance with a total driving force.

In the human-powered vehicle control device of an eleventh aspect according to the tenth aspect, the electronic controller is further configured to control the front suspension such that an initial length of the front suspension reduces upon determining the total driving force is equal to or more than the predetermined threshold.

In accordance with the human-powered vehicle control device according to the eleventh aspect, in a case where the total driving force is equal to or more than the predetermined threshold, the electronic controller controls the front suspension such that an initial length of the front suspension reduces, so that a rider is able to cause the human-powered vehicle to stably travel particularly on a rising road.

In the human-powered vehicle control device of a twelfth aspect according to the tenth or the eleventh aspect, the electronic controller is further configured to control the rear suspension such that an initial length of the rear suspension increases upon determining the total driving force is equal to or more than the predetermined threshold.

In accordance with the human-powered vehicle control device according to the twelfth aspect, in a case where the total driving force is equal to or more than the predetermined threshold, the electronic controller is capable of reducing dumping of the front suspension, so that a rider is able to cause the human-powered vehicle to stably travel.

In the human-powered vehicle control device of a thirteenth aspect according to any one of the tenth to the twelfth aspects, the electronic controller is configured to control, when the total driving force is equal to or more than the predetermined threshold, the rear suspension such that an initial length of the rear suspension increases.

In accordance with the human-powered vehicle control device according to the thirteenth aspect, in a case where the total driving force is equal to or more than the predetermined threshold, the electronic controller controls the rear suspension such that an initial length of the rear suspension increases, so that a rider is able to cause the human-powered vehicle to stably travel particularly on a rising road.

In the human-powered vehicle control device of a fourteenth aspect according to any one of the tenth to the thirteenth aspects, the electronic controller is further configured to control the rear suspension such that a hardness of the rear suspension increases upon determining the total driving force is equal to or more than the predetermined threshold.

In accordance with the human-powered vehicle control device according to the fourteenth aspect, in a case where the total driving force is equal to or more than the predetermined threshold, the electronic controller is capable of reducing dumping of the rear suspension, so that it is possible to effectively transmit human-power driving force to a drive train.

In the human-powered vehicle control device of a fifteenth aspect according to any one of the second to the fourteenth aspects, the electric component includes an adjustable seat post, and the electronic controller is configured to control the adjustable seat post such that a length of the adjustable seat post increases upon determining the total driving force is equal to or more than the predetermined threshold.

In accordance with the human-powered vehicle control device according to the fifteenth aspect, in a case where the total driving force is equal to or more than the predetermined threshold, the electronic controller is configured to control the seat post such that a length of the seat post increases, so that a rider is able to cause the human-powered vehicle to stably travel particularly on a rising road.

In the human-powered vehicle control device of a sixteenth aspect according to any one of the second to the fifteenth aspects, the drive train of the human-powered vehicle includes a chain, the electric component includes a chain guide that is configured to guide the chain. The chain guide is provided to be rotatable around a predetermined rotational axis. The electronic controller is configured to further control the chain guide such that a rotational resistance of the chain guide around the predetermined rotational axis reduces upon determining the total driving force is equal to or more than the predetermined threshold.

In accordance with the human-powered vehicle control device according to the sixteenth aspect, in a case where the total driving force is equal to or more than the predetermined threshold, the electronic controller controls the chain guide such that rotational resistance of the chain guide reduces, so that human-power driving force is effectively transmitted to a drive wheel.

In the human-powered vehicle control device of a seventeenth aspect according to the sixteenth aspect, the electric component includes a derailleur that includes the chain guide.

In accordance with the human-powered vehicle control device according to the seventeenth aspect, the electronic controller is capable of controlling rotational resistance of the chain guide that is included in the derailleur.

In accordance with a human-powered vehicle control device according to the present disclosure, it is possible to contribute to comfortable traveling of a human-powered vehicle including an electric component.

BRIEF DESCRIPTION OF DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
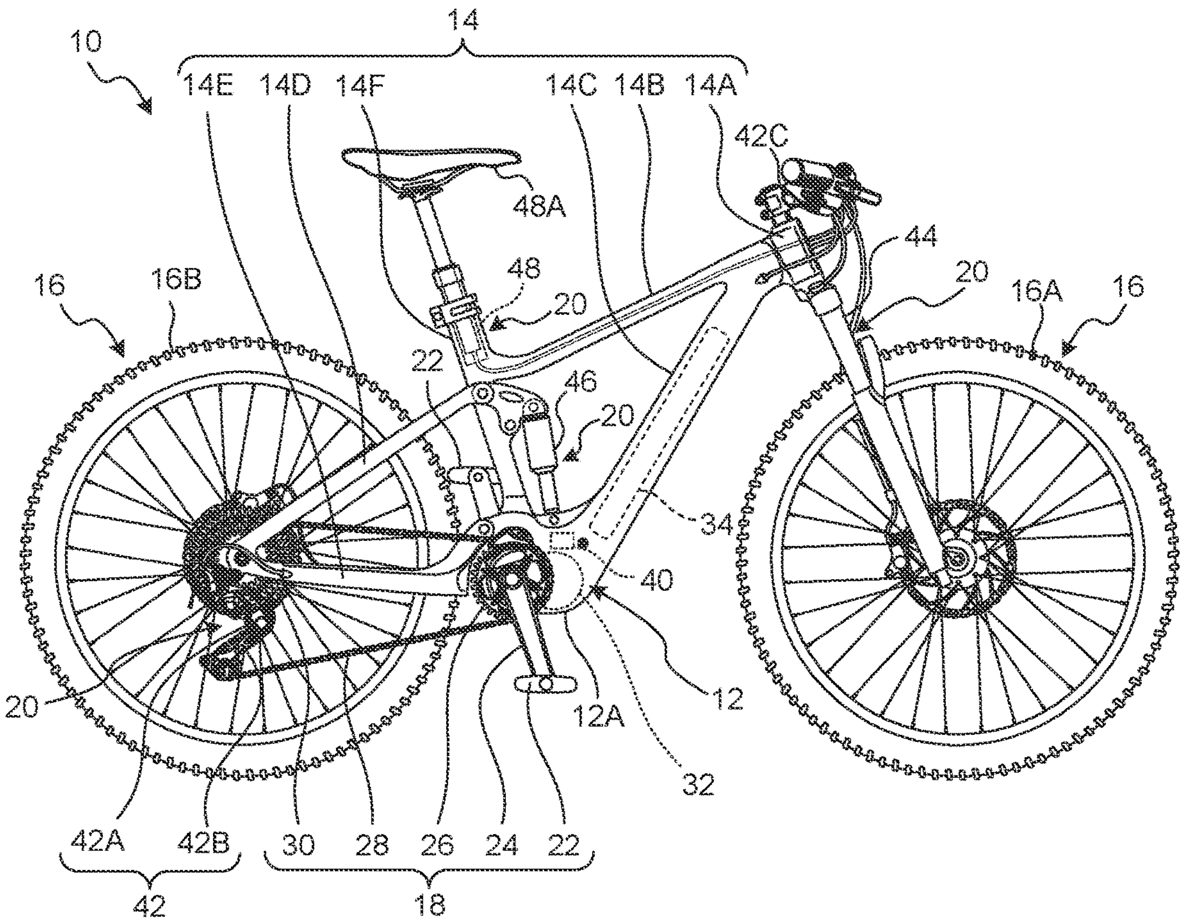
FIG. 1 is a side elevational view illustrating a human-powered vehicle (e.g., a bicycle) including a human-powered vehicle control device according to an embodiment.

As illustrated in FIG. 1, a human-powered vehicle 10 is a mountain bicycle that includes an electric drive unit 12, for example. The human-powered vehicle 10 is not limited to a mountain bicycle, and can be another-type bicycle such as a road bicycle, a cross bicycle, a city bicycle, a freight bicycle, a hand-cycle, and a recumbent bicycle, or can be a vehicle that includes one or three or more wheels, as long as the vehicle is able to be driven by at least human power and includes the electric drive unit 12.

The human-powered vehicle 10 includes a frame 14. The frame 14 includes a head tube 14A, a top tube 14B, a down tube 14C, a seat stay 14D, a chain stay 14E, and a seat tube 14F, for example. The head tube 14A, the top tube 14B, the down tube 14C, and the seat tube 14F constitute a front frame. The seat stay 14D and the chain stay 14E constitute a rear frame.

The human-powered vehicle 10 includes a pair of wheels 16, a drive train 18, the electric drive unit 12, and an electric component 20. In the present embodiment, the wheels 16 include a front wheel 16A and a rear wheel 16B. In the present embodiment, the electric drive unit 12 includes a part of the drive train 18.

The drive train 18 is configured to transmit a human-power driving force to a drive wheel. In the present embodiment, the rear wheel 16B is the drive wheel. The drive train 18 includes a chain 28. The drive train 18 further includes a pair of pedals 22, a crank 24, a front chain wheel 26, and a rear sprocket 30. A first one-way clutch is arranged between the front chain wheel 26 and the crank 24, for example. In a case where the crank 24 rotates in a first rotational direction, the first one-way clutch transmits rotational force from the crank 24 to the front chain wheel 26, and in a case where the crank 24 rotates in a second rotational direction, the first one-way clutch tolerates relative rotation between the crank 24 and the front chain wheel 26. The first one-way clutch can be omitted. The human-power driving force applied to the pair of pedals 22 is transmitted to the rear wheel 16B via the crank 24, the front chain wheel 26, the chain 28, and the rear sprocket 30. In the present embodiment, the rear sprocket 30 includes a plurality of sprockets. The rear sprocket 30 includes two or more sprockets whose numbers of teeth are different from each other, for example.

The drive train 18 can include pullies and a belt, or can include bevel gears and a shaft instead of the front chain wheel 26, the rear sprocket 30, and the chain 28. The crank 24 includes a crank shaft, a first crank arm that is coupled to a first end part of the crank shaft in an axial direction, and a second crank arm that is coupled to a second end part of the crank shaft in the axial direction. The drive train 18 can have any configuration as long as the drive train 18 is configured to transmit the human-power driving force to a drive wheel. The front chain wheel 26 can include a plurality of chain wheels. For example, a rotational axis of the front chain wheel 26 is coaxially arranged with respect to a rotational axis of the crank 24. A rotational shaft of the rear sprocket 30 is coaxially arranged with respect to a rotational shaft of the rear wheel 16B.

The electric drive unit 12 is configured to provide a propelling force to the human-powered vehicle 10. The electric drive unit 12 operates in accordance with the human-power driving force applied to the pedals 22, for example. The electric drive unit 12 includes a motor 32. The electric drive unit 12 includes a housing 12A. In the present embodiment, the electric drive unit 12 further includes a crank shaft and a drive-unit output shaft with which the front chain wheel 26 is connected. A rotational axis of the drive-unit output shaft is coaxially arranged with respect to a rotational axis of the crank 24. The drive-unit output shaft is connected to the crank shaft via a first one-way clutch. The motor 32 is provided in the housing 12A. The motor 32 includes an electric motor.

The motor 32 includes a brushless motor, for example. The motor 32 is configured to be driven in a state where a drive wheel is rotated by the human-power driving force so as to assist rotation of the drive wheel by the human-power driving force. Preferably, the electric drive unit 12 further includes a reducer. A rotational shaft of the motor 32 is connected to the drive-unit output shaft via the reducer. The motor 32 operates by using electric power supplied from a battery 34. The battery 34 is housed in the down tube 14C, for example. The electric drive unit 12 can be included in the wheel 16. The electric drive unit 12 can have any configuration as long as the electric drive unit 12 is capable of driving the wheel 16 directly or indirectly.

The human-powered vehicle 10 includes a human-powered vehicle control device 40 of a human-powered vehicle such as the human-powered vehicle 10 of FIG. 1. In the present embodiment, the human-powered vehicle control device 40 is configured to control the motor 32. In another mode, it may be possible that the human-powered vehicle control device 40 does not control the motor 32. The human-powered vehicle control device 40 adjusts a drive current and a driving voltage to be supplied to the motor 32 so as to control an assistance force for propelling the human-powered vehicle 10. The human-powered vehicle control device 40 can be included in the electric drive unit 12. The human-powered vehicle control device 40 is housed in the housing 12A of the electric drive unit 12, for example. It may be possible that the human-powered vehicle control device 40 is not included in the electric drive unit 12, and is included in the frame 14 of the human-powered vehicle 10. The human-powered vehicle control device 40 operates by using electric power that is supplied from the battery 34. The human-powered vehicle control device 40 includes an electronic controller 52 that is configured to control the electric component 20 provided in the human-powered vehicle 10 in accordance with a total driving force including a human-power driving force applied to the drive train 18 of the human-powered vehicle 10 and an assistance force by the motor 32. The electric component 20 is not the motor 32 that provides the propelling force to the human-powered vehicle 10.

A human-power driving force is indicated by a torque that is provided to the front chain wheel 26 from a rider of the human-powered vehicle 10, for example. The human-power driving force may be indicated by power provided to the front chain wheel 26 from a rider of the human-powered vehicle 10, for example. An assistance force by the motor 32 is indicated by a torque that is provided to the front chain wheel 26 from the motor 32, for example. The assistance force by the motor 32 can be indicated by power provided to the front chain wheel 26 from the motor 32, for example.

The electric component 20 includes a transmission 42. The electric component 20 includes at least one of a front suspension 44 and a rear suspension 46. The electric component 20 includes a seat post 48. The electric component 20 is configured to guide the chain 28, and includes a chain guide 42B that is rotatable around a predetermined rotational axis.

The transmission 42 is arranged on a transmission path of the human-power driving force. The transmission path of the human-power driving force is a route from the pedals 22 to a drive wheel. In the present embodiment, the transmission 42 includes an external-mounted transmission. The transmission 42 includes a derailleur 42A, for example. In the present embodiment, the derailleur 42A includes a rear derailleur. The derailleur 42A can include a front derailleur. The transmission 42 further include the front chain wheel 26 and the rear sprocket 30. In a case where the derailleur 42A includes a rear derailleur, the rear sprocket 30 includes a plurality of sprockets. In a case where the derailleur 42A includes a front derailleur, the front chain wheel 26 includes a plurality of chain wheels. In a case where the derailleur 42A includes a rear derailleur, the derailleur 42A moves the chain 28 from one to another of a plurality of sprockets to cause the transmission 42 to execute speed changing.

In a case where the derailleur 42A includes a front derailleur, the derailleur 42A moves the chain 28 from one to another of a plurality of chain wheels to cause the transmission 42 to execute speed changing. The transmission 42 executes speed changing, thereby leading to change in a transmission ratio of the transmission 42. In a state where driving force is being transmitted from an input part of the transmission 42 to an output part of the transmission 42, a transmission ratio of the transmission 42 is a ratio of a rotational speed of the output part of the transmission 42 to a rotational speed of the input part of the transmission 42. In a case where a rotational speed of the input part of the transmission 42 is defined as Vi, a rotational speed of the output part of the transmission 42 is defined as Vo, and a transmission ratio is defined as R, R is indicated by formula 1. In the present embodiment, Vi corresponds to a rotational speed of a crank 24, and Vo corresponds to a rotational speed of the drive wheel.

$$R = Vo/Vi \quad \text{(Formula 1)}$$

The transmission 42 can include an internal-mounted transmission instead of the external-mounted transmission, and can include an internal-mounted transmission in addition to the external-mounted transmission. The internal-mounted transmission is arranged in a hub of the drive wheel, for example. The internal-mounted transmission can be a geared transmission or a gearless transmission. The transmission 42 includes a transmission state detecting device 42*a* that outputs information related to the present transmission ratio. The information related to the present transmission ratio corresponds to information related to the present transmission stage. In a case where the transmission 42 includes the derailleur 42A, the transmission state detecting device 42*a* outputs a signal according to a position of the derailleur 42A. The transmission state detecting device 42*a* can be configured to output a signal according to a position of a member included in a first electric actuator 42D. The transmission state detecting device 42*a* is electrically connected to the electronic controller 52.

In the present embodiment, the human-powered vehicle control device 40 is configured to control the transmission

42. In another mode, the human-powered vehicle control device 40 can be arranged in the transmission 42. The human-powered vehicle control device 40 includes a manual transmission mode and an automatic transmission mode as transmission modes of the transmission 42. The human-powered vehicle control device 40 is configured to change a transmission ratio of the transmission 42 by the manual transmission mode and the automatic transmission mode. The transmission mode is changed by a rider. For example, the transmission mode can be switched if a transmission operating device 42C is operated by a predetermined operation method, or can be switched if an operating device other than the transmission operating device 42C is operated. The transmission operating device other than the transmission operating device 42C is connected to the human-powered vehicle control device 40 via an electric cable or a wireless communication device. The transmission operating device other than the transmission operating device 42C includes a cyclocomputer, a smartphone, or a tablet computer, for example.

The transmission 42 includes the first electric actuator 42D. The first electric actuator 42D includes an electric motor. The first electric actuator 42D can include an electric motor and a reducer connected with the electric motor. In the present embodiment, the first electric actuator 42D can be arranged in the derailleur 42A, or can be arranged separately from the derailleur 42A to be connected to the derailleur 42A with the use of a Bowden cable. In a case where the transmission 42 includes an internal-mounted transmission, the first electric actuator 42D can be arranged in an internal-mounted transmission, or can be arranged separately from the internal-mounted transmission to be connected to the derailleur 42A with the use of a Bowden cable.

In a case where a transmission mode is a manual transmission mode, the human-powered vehicle control device 40 drives the first electric actuator 42D in accordance with operation of the transmission operating device 42C, and further drives at least one of the derailleur 42A and an internal-mounted transmission by using a driving force of the first electric actuator 42D, for example. Electric power is supplied to the first electric actuator 42D from the battery 34. Electric power can be supplied to the transmission 42 from a battery dedicated to the transmission 42.

In a case where a transmission mode is an automatic transmission mode, the human-powered vehicle control device 40 drives the first electric actuator 42D in accordance with a traveling state of the human-powered vehicle 10, and further drives at least one of the derailleur 42A and an internal-mounted transmission by using a driving force of the first electric actuator 42D. The traveling state of the human-powered vehicle 10 includes at least one of a cadence of the crank 24, a vehicle speed of the human-powered vehicle 10, and a human-power driving force. The cadence is the rotation number per minute of the rotating crank 24, for example. The human-powered vehicle control device 40 controls the transmission 42 such that the cadence is kept within a predetermined range, for example. In a case where a cadence is changed from a value within the predetermined range to a value that is smaller than a lower-limit value of the predetermined range, the human-powered vehicle control device 40 controls the transmission 42 such that a transmission ratio of the transmission 42 reduces. In a case where a cadence is changed from a value within the predetermined range to a value that is greater than an upper-limit value of the predetermined range, the human-powered vehicle control device 40 controls the transmission 42 such that a transmission ratio of the transmission 42 increases. The human-powered vehicle control device 40 controls the transmission 42 in accordance with a total driving force including a human-power driving force applied to the drive train 18 of the human-powered vehicle 10 and an assistance force by the motor 32.

The front suspension 44 supports a hub of the front wheel 16A to be rotatable. The front suspension 44 includes a shock absorber that expands and contracts in a longitudinal direction thereof. The front suspension 44 is configured to attenuate an impact transmitted from a road surface to the front wheel 16A by using the shock absorber. The front suspension 44 is controlled by the human-powered vehicle control device 40. The human-powered vehicle control device 40 controls the front suspension 44 in accordance with a total driving force including a human-power driving force applied to the drive train 18 of the human-powered vehicle 10 and an assistance force by the motor 32.

The human-powered vehicle control device 40 is configured to change at least one of an initial length of the front suspension 44, a stroke amount of the front suspension 44, and hardness of the front suspension 44. The front suspension 44 includes a second electric actuator 44*a*. The second electric actuator 44*a* includes at least one electric motor or at least one solenoid. The human-powered vehicle control device 40 controls the second electric actuator 44*a*. Electric power is supplied to the second electric actuator 44*a* from the battery 34. A stroke amount of the front suspension 44 is a length in which the shock absorber is capable of expanding and contracting. Hardness of the front suspension 44 is attenuation force of the shock absorber. A configuration of the front suspension 44 is a general structure, and thus explanation thereof is omitted.

The second electric actuator 44*a* is directly or indirectly connected to a control valve provided in the front suspension 44. The second electric actuator 44*a* can be connected to a control valve of the front suspension 44 via a cable. The front suspension 44 includes a first sensor that outputs information related to an initial length of the front suspension 44 and a second sensor that outputs information related to a hardness of the front suspension 44. The first sensor and the second sensor are electrically connected to the electronic controller 52. The first sensor and the second sensor can be configured to output signals according to a state of a control valve, or can be configured to output signals according to a state of the second electric actuator 44*a*. The first sensor and the second sensor include a magnetic sensor, a potentiometer, or an optical sensor among other things, for example.

A first end part of the rear suspension 46 in an expanding-and-contracting direction thereof is connected with a front frame, and a second end part of the rear suspension 46 in the expanding-and-contracting direction is connected with a rear frame. The front frame and the rear frame are configured to be rotatable around respective predetermined rotational axes. The rear frame forms a swing arm. The rear suspension 46 includes a shock absorber that expands and contracts in a longitudinal direction thereof. The rear suspension 46 is configured to attenuate an impact transmitted from a road surface to the rear wheel 16B by using the shock absorber. The rear suspension 46 operates by electric power supplied from the battery 34. The rear suspension 46 is controlled by the human-powered vehicle control device 40. The human-powered vehicle control device 40 controls the rear suspension 46 in accordance with a total driving force including a human-power driving force applied to the drive train 18 of the human-powered vehicle 10 and an assistance force by the motor 32.

The human-powered vehicle control device 40 is configured to change at least one of an initial length of the rear suspension 46, a stroke amount of the rear suspension 46, and hardness of the rear suspension 46. The rear suspension 46 includes a third electric actuator 46*a*. The third electric actuator 46*a* includes at least one electric motor or at least one solenoid. The human-powered vehicle control device 40 controls the third electric actuator 46*a*. Electric power is supplied to the third electric actuator 46*a* from the battery 34. A stroke amount of the rear suspension 46 is a length in which the shock absorber is capable of expanding and contracting. Hardness of the rear suspension 46 is attenuation force of the shock absorber. A configuration of the rear suspension 46 is a general structure, and thus explanation thereof is omitted.

The third electric actuator 46*a* is directly or indirectly connected to a control valve provided in the front suspension 44. The third electric actuator 46*a* can be connected to a control valve of the rear suspension 46 via a cable. The rear suspension 46 includes a third sensor that outputs information related to an initial length of the rear suspension 46 and a fourth sensor that outputs information related to a hardness of the rear suspension 46. The third sensor and the fourth sensor are electrically connected to the electronic controller 52. The third sensor and the fourth sensor can be configured to output signals according to a state of a control valve, or can be configured to output signals according to a state of the third electric actuator 46*a*. The third sensor and the fourth sensor include a magnetic sensor, a potentiometer, or an optical sensor among other things, for example.

The seat post 48 is attached to the seat tube 14F. A saddle 48A is attached to the seat post 48. The seat post 48 is configured to adjust a height from a road surface to the saddle 48A if a length of a part protruding from the seat tube 14F is changed. The seat post 48 operates by electric power supplied from the battery 34. The seat post 48 is controlled by the human-powered vehicle control device 40. The human-powered vehicle control device 40 controls the seat post 48 in accordance with a total driving force including a human-power driving force applied to the drive train 18 of the human-powered vehicle 10 and an assistance force by the motor 32. The seat post 48 includes a fourth electric actuator 48*a*. The fourth electric actuator 48*a* includes at least one electric motor or at least one solenoid. The human-powered vehicle control device 40 controls a length of the seat post 48 by the fourth electric actuator 48*a*. Electric power is supplied from the battery 34 to the fourth electric actuator 48*a*. The seat post 48 includes a dropper or an adjustable seat post. Configurations of the dropper and the adjustable seat post are general structures, and thus explanation thereof is omitted.

The fourth electric actuator 48*a* is directly or indirectly connected to a control valve provided in the seat post 48, for example. The fourth electric actuator 48*a* can be connected to a control valve of the seat post 48 via a cable. In a state where the control valve is opened, the seat post 48 extends by hydraulic pressure, and if a control valve is closed, a length thereof is kept, for example. The fourth electric actuator 48*a* can be configured to expand and contract by a driving force of the fourth electric actuator 48*a* instead of the control of the control valve. The seat post 48 includes the third sensor that outputs information related to a length of the seat post 48. The third sensor is electrically connected to the electronic controller 52. The third sensor can be configured to output a signal according to a state of the control valve, or can output a signal according to a state of the fourth electric actuator 48*a*. The third sensor includes a magnetic sensor, a potentiometer, or an optical sensor among other things, for example.

The chain guide 42B is included in the derailleur 42A. The chain guide 42B includes a resistance member. The resistance member provides a rotational resistance around a predetermined rotational axis with respect to the chain guide 42B rotating around the rotational axis. The resistance member includes an electric motor, a hydraulic damper, or a friction plate, for example. Electric power is supplied from the battery 34 to the chain guide 42B. The chain guide 42B is controlled by the human-powered vehicle control device 40. The human-powered vehicle control device 40 controls the chain guide 42B in accordance with a total driving force including a human-power driving force applied to the drive train 18 of the human-powered vehicle 10 and an assistance force by the motor 32. As a structure of the chain guide 42B is disclosed in, for example, U.S. Pat. Nos. 8,202,182, 9,377,089, and the like, and thus explanation thereof is omitted. The human-powered vehicle control device 40 controls a resistance member so as to change a rotational resistance of the chain guide 42B around a predetermined rotational axis. The chain guide 42B includes the fourth sensor that outputs information related to a rotational resistance of the chain guide 42B. The fourth sensor is electrically connected to the electronic controller 52. The fourth sensor can be configured to output a signal according to a state of the rotational resistance of the chain guide 42B.

Figure 2:
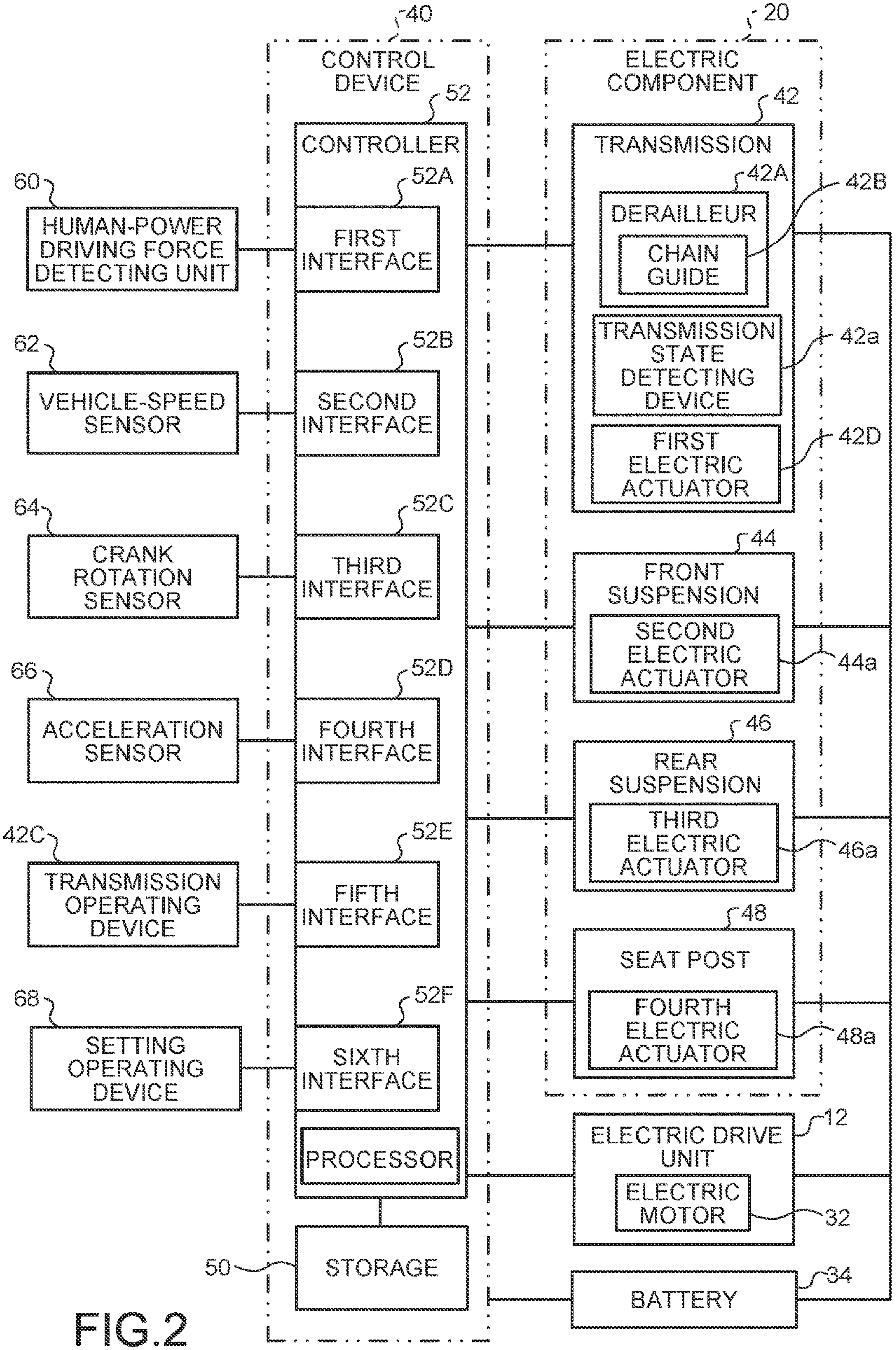
FIG. 2 is a block diagram illustrating an electric configuration of the human-powered vehicle including the human-powered vehicle control device control device according to the embodiment.

As illustrated in FIG. 2, the human-powered vehicle control device 40 includes a storage 50 in addition to the electronic controller 52. The storage 50 includes any computer storage device or any non-transitory computer-readable medium with the sole exception of a transitory, propagating signal. For example, the storage 50 includes a storage such as a non-volatile memory and a volatile memory. The non-volatile memory includes at least one of a Read Only Memory (ROM), a flash memory, and a hard disk, for example. The volatile memory includes a Random Access Memory (RAM), for example. The storage 50 stores therein software for controlling the electric component 20. The storage 50 stores therein information related to two or more predetermined thresholds to be used for controlling the electric component 20, for example. The two or more predetermined thresholds are different from each other.

The electronic controller 52 includes at least one processor such as a Central Processing Unit (CPU) and a Micro Processing Unit (MPU). The electronic controller 52 is configured such that the at least one processor execute a control program stored in the ROM by using the RAM as a work region, for example, so as to control operation of the electric component 20. . Thus, the term "electronic controller" as used herein refers to hardware that executes a software program, and does not include a human being. In a case where the electronic controller 52 includes two or more processors, the two or more processors can be arranged at positions that are separate from each other, for example, one of the two or more processors can be configured to communicate with another calculation processing device via a wireless communication device, or can be configured to communicate with another processor via the Internet.

The human-powered vehicle 10 includes a human-power driving force detecting unit 60, a vehicle-speed sensor 62, a crank rotation sensor 64, and an acceleration sensor 66. The electronic controller 52 is connected to the human-power driving force detecting unit 60, the vehicle-speed sensor 62, the crank rotation sensor 64, and the acceleration sensor 66 via at least one of an electric cable and a wireless communication device. The electronic controller 52 is connected to the battery 34 via an electric cable. The human-power driving force detecting unit 60, the crank rotation sensor 64, and the acceleration sensor 66 can be included in the electric drive unit 12. The terms “sensor” and as “detector” used herein refers to a hardware device or instrument designed to detect the presence or absence of a particular event, object, substance, or a change in its environment, and to emit a signal in response. The terms “sensor” and as “detector” as used herein does not include a human being.

Preferably, the electronic controller 52 includes a first interface 52A. The first interface 52A is configured to input information that is detected by the human-power driving force detecting unit 60. Preferably, the electronic controller 52 includes a second interface 52B. The second interface 52B is configured to input information that is detected by the vehicle-speed sensor 62. Preferably, the electronic controller 52 includes a third interface 52C. The third interface 52C is configured to input information that is detected by the crank rotation sensor 64. Preferably, the electronic controller 52 includes a fourth interface 52D. The fourth interface 52D is configured to input information that is detected by the acceleration sensor 66. Preferably, the electronic controller 52 includes a fifth interface 52E. The fifth interface 52E is configured to input information a speed changing command that is transmitted from the transmission operating device 42C. Preferably, the electronic controller 52 includes a sixth interface 52F. The sixth interface 52F is configured to input a setting command that is transmitted from a setting operating device 68.

Each of the first to the sixth interface 52A, 52B, 52C, 52D, 52E, and 52F includes at least one of a cable connecting port and a wireless communication device, for example. The wireless communication device includes a short-range distance wireless communication unit, for example. The short-range distance wireless communication unit is configured to execute wireless communication on the basis of a wireless communication standard such as Bluetooth (Registered Trademark) and ANT+. In a case where an electric cable is connected with each of the first to the sixth interface 52A, 52B, 52C, 52D, 52E, and 52F, a corresponding cable connecting port can be omitted and the corresponding electric cable can be fixed thereto.

The human-power driving force detecting unit 60 is configured to output information related to a human-power driving force to the electronic controller 52. For example, the human-power driving force detecting unit 60 is configured to output a signal according to a human-power driving force applied to the crank 24. The human-power driving force detecting unit 60 is arranged on a transmission path of the human-power driving force between a rotational shaft of the crank 24 to the front chain wheel 26. The human-power driving force detecting unit 60 can be arranged on the rotational shaft of the crank 24 or the front chain wheel 26. The human-power driving force detecting unit 60 can be arranged on the crank 24 or the pedal 22. The human-power driving force detecting unit 60 can be realized with the use of, for example, a strain sensor, a magnetostrictive sensor, an optical sensor, and a pressure sensor among other things. It is sufficient that the human-power driving force detecting unit 60 is a sensor configured to output a signal according to a human-power driving force applied to the crank 24 or the pedal 22.

The vehicle-speed sensor 62 is configured to output information related to a speed of the human-powered vehicle 10 to the electronic controller 52. The vehicle-speed sensor 62 is configured to output a signal according to a rotational speed of the wheel 16. The vehicle-speed sensor 62 is arranged on the chain stay 14E of the human-powered vehicle 10, for example. The vehicle-speed sensor 62 includes a magnetic sensor. The vehicle-speed sensor 62 is configured to detect a magnetic field of at least one magnet attached to a spoke, a disk brake rotor, or a hub of the wheel 16. The vehicle-speed sensor 62 is configured to output a signal if detecting a magnetic field, for example. The electronic controller 52 is configured to calculate a traveling speed of the human-powered vehicle 10 on the basis of information related to a time interval between signals or a width of a signal output from the vehicle-speed sensor 62 in accordance with rotation of the wheel 16 and a circumference length of the wheel 16, for example. As long as the vehicle-speed sensor 62 is configured to output information related to a speed of the human-powered vehicle 10, the vehicle-speed sensor 62 can include, not limited to a magnetic sensor, another sensor such as an optical sensor, an acceleration sensor, and a GPS reception device.

The crank rotation sensor 64 is configured to output information according to a rotational state of the crank 24 to the electronic controller 52. For example, the crank rotation sensor 64 is configured to output a signal according to a rotational angle of the crank 24. The crank rotation sensor 64 is configured to include a magnetic sensor that outputs a signal according to intensity of a magnetic field. A circular magnet whose intensity of a magnetic field changes along a circumferential direction thereof is arranged on a rotational shaft of the crank 24, a member that rotates integrally with the rotational shaft of the crank 24, or a power transmitting path from the rotational shaft of the crank 24 to the front chain wheel 26. The member that rotates integrally with the rotational shaft of the crank 24 can include an output shaft of the motor 32. For example, in a case where a one-way clutch is not provided between the crank 24 and the front chain wheel 26, the magnet can be arranged in the front chain wheel 26. The crank rotation sensor 64 can include an optical sensor instead of the magnetic sensor. The electronic controller 52 is capable of calculating a rotational speed of the crank 24 on the basis of a change amount per unit time of a rotational angle of the crank 24.

The acceleration sensor 66 is configured to output information related to an acceleration in an advancing direction of the human-powered vehicle 10 to the electronic controller 52. The electronic controller 52 is electrically connected to the electric component 20, the electric motor 32 of the electric drive unit 12, and the battery 34. Preferably, the electronic controller 52 further includes an inverter circuit that is electrically connected to the electric motor 32. The inverter circuit can be separately arranged from the electronic controller 52 while not being included in the electronic controller 52. The electronic controller 52 is connected to the electric component 20 by an electric cable or a wireless communication device to be able to communicate with each other. The electronic controller 52 is connected to the battery 34 by an electric cable.

The electronic controller 52 is configured to control the motor 32 in accordance with a total driving force including a human-power driving force applied to the drive train 18 of the human-powered vehicle 10 and an assistance force by the motor 32, and a predetermined threshold. In the present embodiment, the electronic controller 52 calculates a human-power driving force in accordance with information related to a human-power driving force, which is input from the human-power driving force detecting unit 60, in accordance with control information of the motor 32 so as to calculate an assistance force by the motor 32. The electronic controller 52 adds the calculated human-power driving force and the calculated assistance force to each other so as to calculate a total driving force. The information related to the predetermined threshold is stored in a storage 50.

The electronic controller 52 is configured to control the motor 32 by a plurality of operation states whose maximum values of assistance force by the motor 32 are different from each other, and predetermined thresholds corresponding to the respective operation states are different from each other. The predetermined thresholds corresponding to the respective operation states can be equal. The electronic controller 52 has a first assist mode, a second assist mode, and a third assist mode as the plurality of operation states whose maximum values of assistance force by the motor 32 are different from each other, for example. The maximum value of assistance force in the first assist mode is greater than the maximum value of assistance force in the second assist mode. The maximum value of assistance force in the second assist mode is greater than the maximum value of assistance force in the third assist mode. The storage 50 stores therein information related to the assist modes and information related to predetermined thresholds corresponding the respective assist modes in association with each other, for example.

A predetermined threshold corresponding to the first assist mode has a value obtained by adding a predetermined first value to the maximum value of assistance force in the first assist mode, for example. A predetermined threshold corresponding to the second assist mode has a value obtained by adding a predetermined second value to the maximum value of assistance force in the second assist mode, for example. A predetermined threshold corresponding to the third assist mode has a predetermined third value. The predetermined threshold corresponding to the first assist mode is greater than the predetermined threshold corresponding to the second assist mode. The predetermined threshold corresponding to the second assist mode is greater than the predetermined threshold corresponding to the third assist mode.

The predetermined first value, the predetermined second value, and the predetermined third value can be an equal value, or can be different values. In a case where the predetermined first value and the predetermined second value are indicated by torque, the predetermined first value and the predetermined second value are values within a range equal to or more than 30 Nm and equal to or less than 70 Nm, for example. In a case where the predetermined third value is indicated by torque, the predetermined third value is a value within a range equal to or more than 50 Nm and equal to or less than 90 Nm, for example. If an assistance force by the motor 32 does not reach the maximum value, the electronic controller 52 controls the motor 32 such that the more a human-power driving force increases, the more an assistance force increases. The electronic controller 52 controls the motor 32 such that the more a human-power driving force reduces, the more an assistance force reduces.

If a user operates the setting operating device 68, the first to the third assist modes are set. The setting operating device 68 is attached to a handlebar of the human-powered vehicle 10, for example. As long as being able to be operated by a rider of the human-powered vehicle 10, the setting operating device 68 can be arranged at an arbitrary position of the human-powered vehicle 10 such as the top tube 14B. The setting operating device 68 includes an electric switch to be operated by a hand of a user, for example. The setting operating device 68 is connected to the human-powered vehicle control device 40 via an electric cable or a wireless communication device. The setting operating device can include a cyclocomputer, a smartphone, or a tablet computer, for example. Information related to a presently-set assist mode among the first to the third assist mode is stored in the storage 50.

The electronic controller 52 controls the electric component 20 on the basis of information that is input from at least one of the human-power driving force detecting unit 60, the vehicle-speed sensor 62, the crank rotation sensor 64, and the acceleration sensor 66. In the present embodiment, the electric component 20 includes the derailleur 42A, and the chain guide 42B is included in the derailleur 42A. The transmission 42, the front suspension 44, the rear suspension 46, and the seat post 48 are electrically connected to the battery 34 by electric cables. The electronic controller 52 executes a first control process illustrated in FIG. 3 so as to control the electric component 20.

First Control Process

Figure 3:
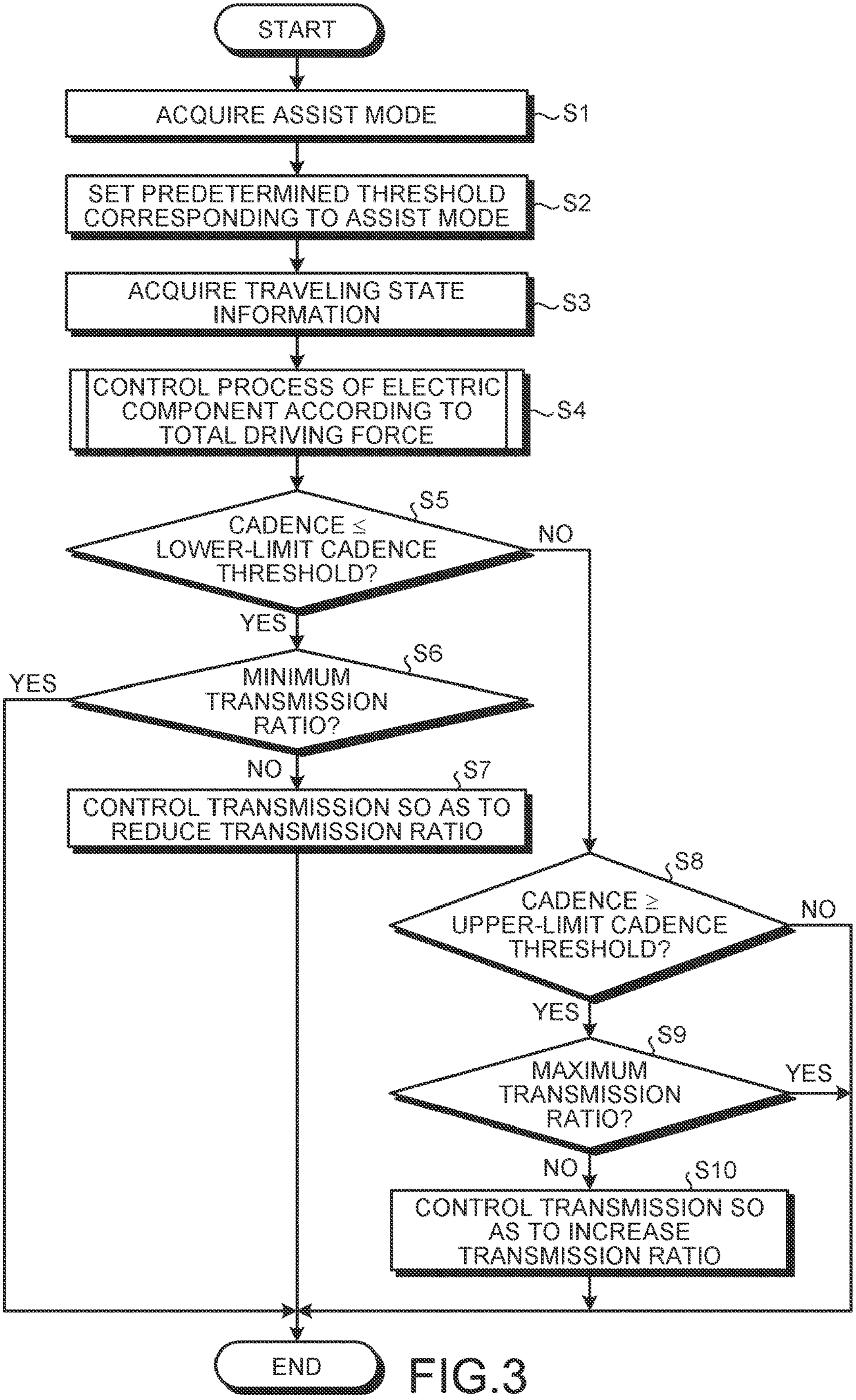
FIG. 3 is a flowchart illustrating one example of a first control process executed by the electronic controller according to the embodiment.

The electronic controller 52 executes the first control process illustrated in FIG. 3. If electric power is supplied, the electronic controller 52 starts to execute processing from Step S1, and if the first control process is ended, the electronic controller 52 repeatedly starts to execute processing from Step S1 until supply of electric power is stopped. If starting to execute the first control process, in Step S1, the electronic controller 52 acquires information related to a presently-set assist mode from the storage 50. In Step S2, the electronic controller 52 sets a predetermined threshold corresponding to the present assist mode. The electronic controller 52 acquires traveling state information in Step S3.

The traveling state information includes information related to a human-power driving force that is input from the human-power driving force detecting unit 60. The traveling state information includes information related to a traveling speed of the human-powered vehicle 10 that is input from the vehicle-speed sensor 62. The traveling state information includes information related to a rotational speed of the crank 24 that is input from the crank rotation sensor 64. The traveling state information includes information related to an acceleration in an advancing direction of the human-powered vehicle 10 that is input from the acceleration sensor 66. The traveling state information includes information related to a torque or power of assistance force output from the motor 32 of the electric drive unit 12.

In Step S4, the electronic controller 52 executes a control process of an electric component according to a total driving force. In Step S5, the electronic controller 52 determines whether or not a cadence is equal to or less than a lower-limit cadence threshold. In a case where a cadence is a lower-limit cadence threshold, in Step S6, the electronic controller 52 determines whether or not a transmission ratio of the transmission 42 is the minimum transmission ratio. In a case where a transmission ratio of the transmission 42 is the minimum transmission ratio, the electronic controller 52 ends the first control process. In a case where a transmission ratio of the transmission 42 is not the minimum transmission ratio, in Step S7, the electronic controller 52 controls the transmission 42 so as to reduce the transmission ratio, and ends the first control process.

In a case where a cadence is equal to or less than a lower-limit cadence threshold, in Step S8, the electronic controller 52 determines whether or not a cadence is equal to or more than an upper-limit cadence threshold. In a case where a cadence is equal to or more than an upper-limit cadence threshold, the electronic controller 52 ends the first control process.

In a case where a cadence is equal to or more than an upper-limit cadence threshold, in Step S9, the electronic controller 52 determines whether or not a transmission ratio of the transmission 42 is the maximum transmission ratio. In a case where a transmission ratio of the transmission 42 is the maximum transmission ratio, the electronic controller 52 ends the first control process. In a case where a transmission ratio of the transmission 42 is not the maximum transmission ratio, in Step S10, the electronic controller 52 controls the transmission 42 so as to increase a transmission ratio, and ends the first control process.

Second Control Process

In a case where a total driving force is equal to or more than a predetermined threshold, the electronic controller 52 can control the transmission 42 so as to reduce a transmission ratio. In an electric-component controlling process according to a driving force, the electronic controller 52 executes a second control process illustrated in FIG. 4. If starting the second control process, in Step S11, the electronic controller 52 determines whether or not a total driving force is equal to or more than a predetermined threshold. In a case where a total driving force is not equal to or more than a predetermined threshold, the electronic controller 52 ends the second control process.

In a case where a total driving force is equal to or more than a predetermined threshold, in Step S12, the electronic controller 52 determines whether or not a transmission ratio of the transmission 42 is the minimum transmission ratio. In a case where a transmission ratio of the transmission 42 is the minimum transmission ratio, the electronic controller 52 ends the second control process. In a case where a transmission ratio of the transmission 42 is not the minimum transmission ratio, in Step S13, the electronic controller 52 controls the transmission 42 so as to reduce the transmission ratio, and ends the second control process.

The electronic controller 52 can omit the determination process of Step S12. In a case where the determination process of Step S12 is omitted, if determination result in Step S11 is Yes, the electronic controller 52 executes the process of Step S13.

Third Control Process

In a case where a peak value of the total driving force when a total driving force changes from increasing to decreasing is continuously equal to or more than a predetermined threshold for a predetermined first number of times, the electronic controller 52 can control the transmission 42 so as to reduce a transmission ratio. In a process for controlling an electric component in accordance with a driving force, the electronic controller 52 can execute a third control process illustrated in FIG. 5 instead of the second control process. If starting the third control process, in Step S21, the electronic controller 52 determines whether or not a peak value of the total driving force when a total driving force changes from increasing to decreasing is continuously equal to or more than a predetermined threshold for the predetermined first number of times. In other words, the peak value of the total driving force is continuously equal to or more than the predetermined threshold for the predetermined first number of times, when the peak value is consecutively equal to or more than the predetermined threshold for the predetermined first number of times. In a case where a peak value of total driving force is not continuously equal to or more than a predetermined threshold for the predetermined first number of times, the electronic controller 52 ends the third control process. Commonly, a peak value of total driving force is generated each time when the crank 24 half rotates.

In a case where a peak value of total driving force is continuously equal to or more than a predetermined threshold for the predetermined first number of times, in Step S22, the electronic controller 52 determines whether or not a transmission ratio of the transmission 42 is the minimum transmission ratio. In a case where a transmission ratio of the transmission 42 is the minimum transmission ratio, the electronic controller 52 ends the third control process. In a case where a transmission ratio of the transmission 42 is not the minimum transmission ratio, in Step S23, the electronic controller 52 controls the transmission 42 so as to reduce the transmission ratio, and further ends the third control process.

The electronic controller 52 can omit the determination process of Step S22. In a case where the determination process of Step S22 is omitted, if determination result in Step S21 is Yes, the electronic controller 52 executes the process of Step S23. For example, the predetermined first number of times is a value within a range from one to ten, and preferably, is a value within a range from two to five.

Fourth Control Process

In a case where an acceleration in an advancing direction of the human-powered vehicle 10 does not continuously increase for a predetermined second number of times, the electronic controller 52 can control the transmission 42 so as to reduce a transmission ratio. In a process for controlling an electric component in accordance with a driving force, the electronic controller 52 can execute a fourth control process illustrated in FIG. 6 instead of the second control process or the third control process. If starting the fourth control process, in Step S31, the electronic controller 52 determines whether or not an acceleration in an advancing direction of the human-powered vehicle 10 continuously increases for the predetermined second number of times. The electronic controller 52 acquires information related to an acceleration in an advancing direction of the human-powered vehicle 10 with a predetermined period.

In a case where a continuous increasing number of acceleration in an advancing direction of the human-powered vehicle 10 is equal to or more than the predetermined second number of times, the electronic controller 52 ends the fourth control process. In a case where an acceleration in an advancing direction of the human-powered vehicle 10 does not continuously increase for the predetermined second number of times, in Step S32, the electronic controller 52 determines whether or not a transmission ratio of the transmission 42 is the minimum transmission ratio.

In a case where a transmission ratio of the transmission 42 is the minimum transmission ratio, the electronic controller 52 ends the fourth control process. In a case where a transmission ratio of the transmission 42 is not the minimum transmission ratio, in Step S33, the electronic controller 52 controls the transmission 42 so as to reduce a transmission ratio, and ends the fourth control process.

The electronic controller 52 can omit the determination process of Step S32. In a case where the determination process of Step S32 is omitted, if determination result in Step S31 is Yes, the electronic controller 52 executes the process of Step S33. For example, the predetermined second number of times is a value within a range from one to ten, and preferably, is a value within a range from two to five.

Fifth Control Process

Figure 7:
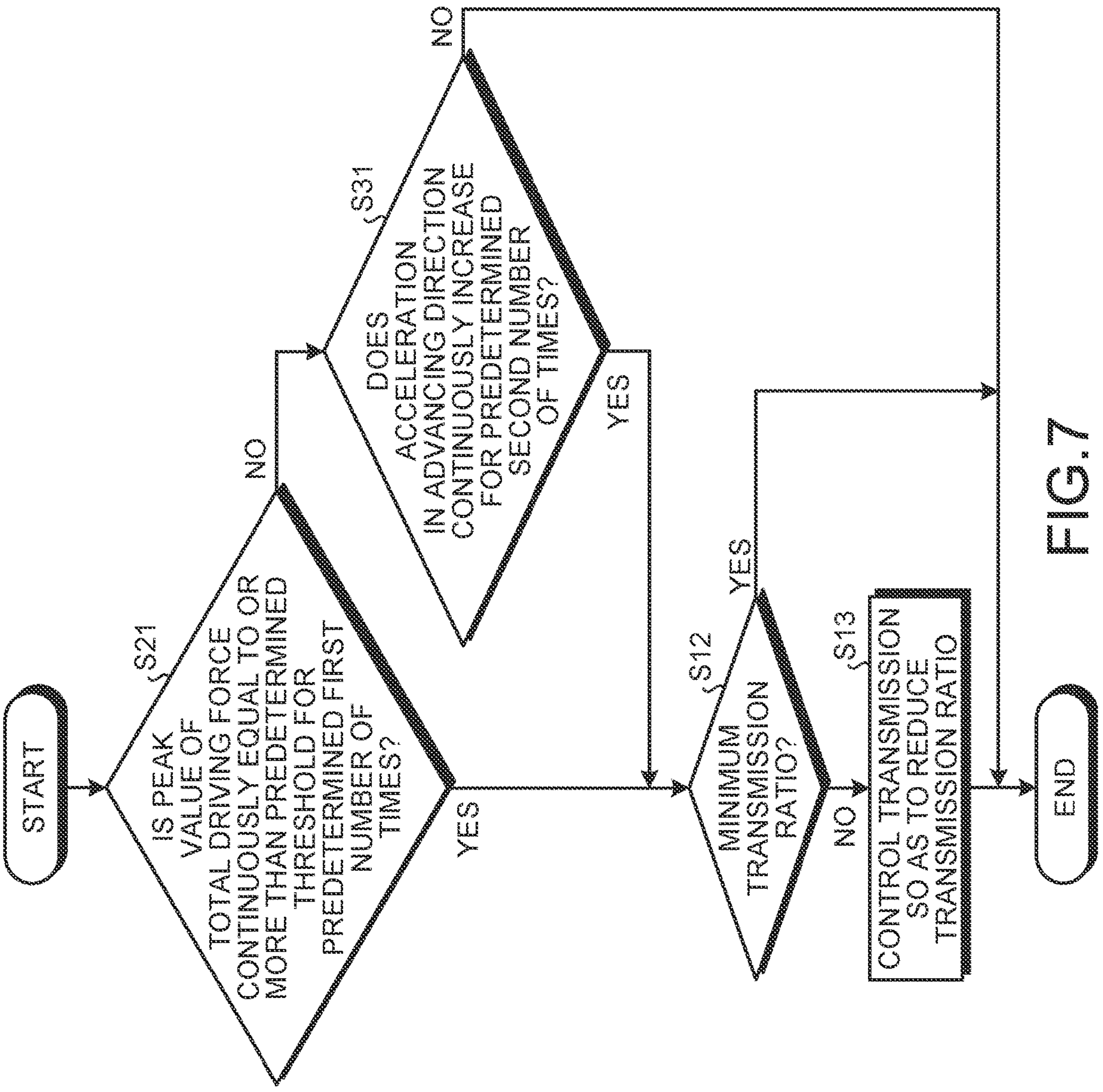
FIG. 7 is a flowchart illustrating one example of a fifth control process executed by the electronic controller according to the embodiment.

In a process for controlling an electric component in accordance with a driving force, the electronic controller 52 can execute a fifth control process illustrated in FIG. 7 instead of the second to the fourth control processes. If starting the fifth control process, in Step S21, the electronic controller 52 determines whether or not a peak value of total driving force when a total driving force changes from increasing to decreasing is continuously equal to or more than a predetermined threshold for the predetermined first number of times.

In a case where a peak value of total driving force is not continuously equal to or more than a predetermined threshold for the predetermined first number of times, in Step S31, the electronic controller 52 determines whether or not an acceleration in an advancing direction of the human-powered vehicle 10 continuously increases for the predetermined second number of times. In a case where a continuous increasing number of acceleration in an advancing direction of the human-powered vehicle 10 is equal to or more than the predetermined second number of times, the electronic controller 52 ends the fifth control process.

In a case where the electronic controller 52 determines in Step S21 that an acceleration in an advancing direction of the human-powered vehicle 10 does not continuously increase for the predetermined first number of times, the electronic controller 52 shifts the processing to Step S12. In a case where the electronic controller 52 determines in Step S31 that an acceleration in an advancing direction of the human-powered vehicle 10 does not continuously increase for the predetermined second number of times, the electronic controller 52 shifts the processing to Step S12.

In a case where the electronic controller 52 determines in Step S12 that a transmission ratio of the transmission 42 is the minimum transmission ratio, the electronic controller 52 ends the fifth control process. In a case where the electronic controller 52 determines in Step S12 that a transmission ratio of the transmission 42 is not the minimum transmission ratio, the electronic controller 52 controls the transmission 42 so as to reduce a transmission ratio in Step S13, and ends the fifth control process. In the flowchart illustrated in FIG. 7, Step S21 can be replaced with Step S31, and further Step S31 can be replaced with Step S21. In the flowchart illustrated in FIG. 7, Step S21 can be replaced with Step S11 in the flowchart illustrated in FIG. 4.

Sixth Control Process

Figure 8:
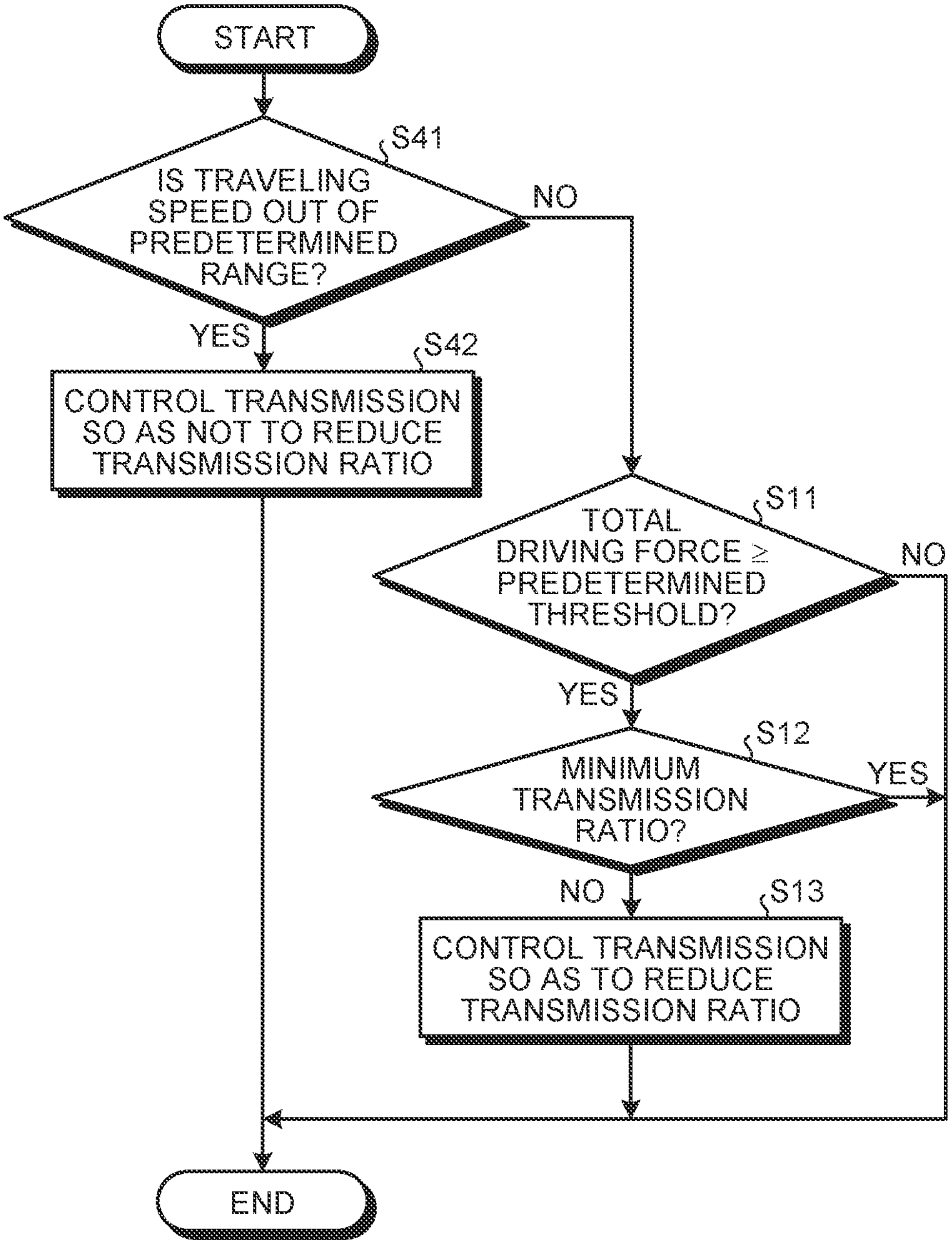
FIG. 8 is a flowchart illustrating one example of a sixth control process executed by the electronic controller according to the embodiment.

In a case where a traveling speed of the human-powered vehicle 10 is out of a predetermined range, the electronic controller 52 can control the transmission 42 so as not to reduce a transmission ratio in accordance with a total driving force. In a process for controlling an electric component in accordance with a driving force, the electronic controller 52 can execute a sixth control process illustrated in FIG. 8 instead of the second to the fifth control processes. If starting the sixth control process, in Step S41, the electronic controller 52 determines whether or not a traveling speed of the human-powered vehicle 10 is out of a predetermined range. Next, the electronic controller 52 ends the sixth control process. The predetermined range is a range equal to or more than 3 km/h and equal to or less than 30 km/h, for example. In a case where a traveling speed of the human-powered vehicle 10 is within the predetermined range, the electronic controller 52 executes the first control process illustrated in FIG. 4, and ends the sixth control process.

Figure 4:
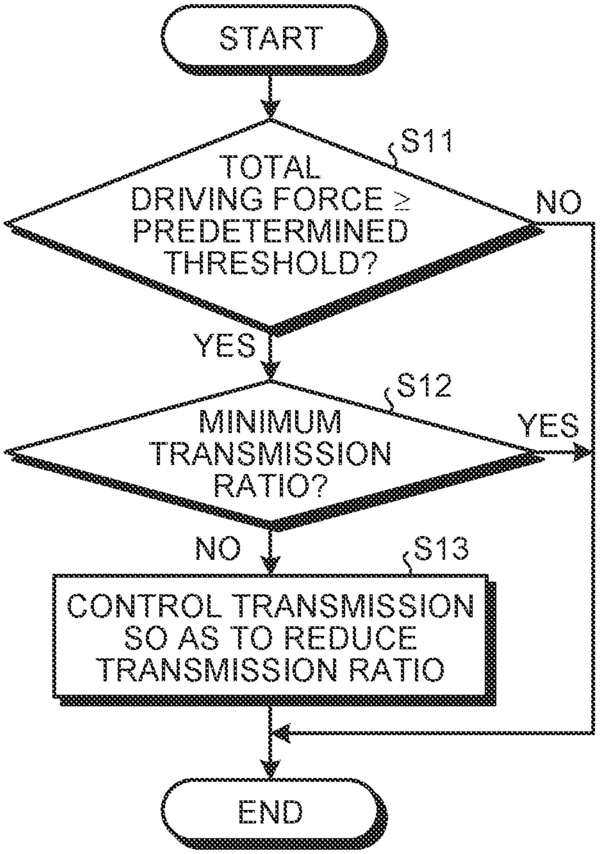
FIG. 4 is a flowchart illustrating one example of a second control process executed by the electronic controller according to the embodiment.
Figure 5:
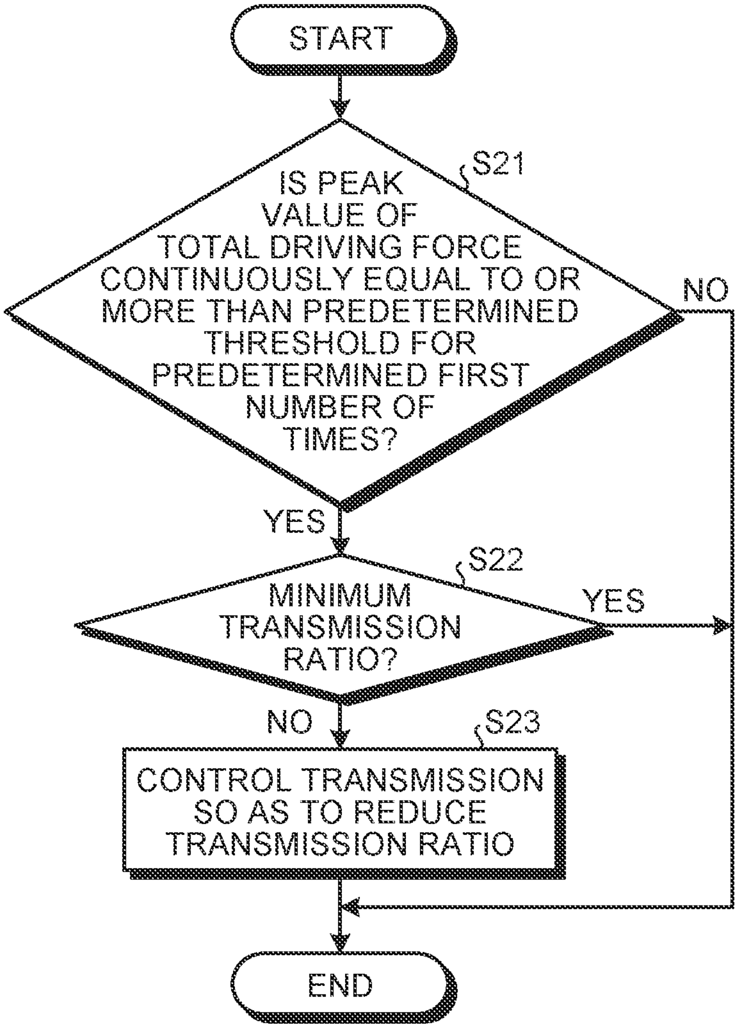
FIG. 5 is a flowchart illustrating one example of a third control process executed by the electronic controller according to the embodiment.
Figure 6:
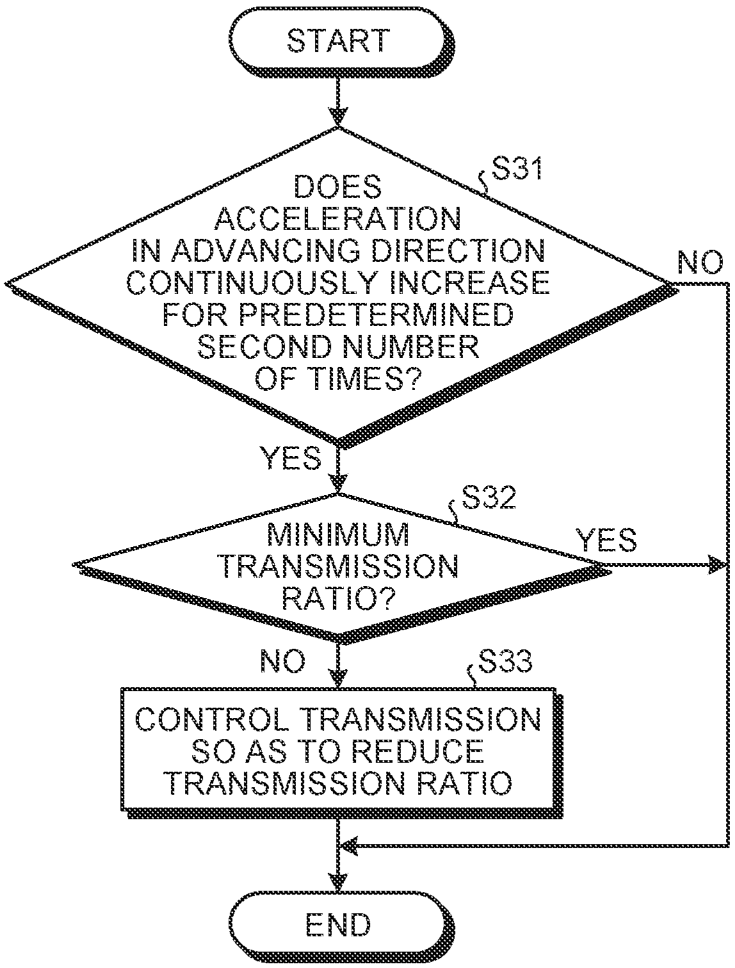
FIG. 6 is a flowchart illustrating one example of a fourth control process executed by the electronic controller according to the embodiment.

In a case where a traveling speed of the human-powered vehicle 10 is within a predetermined range, the electronic controller 52 can execute the third control process illustrated in FIG. 5, the fourth control process illustrated in FIG. 6, or the fifth control process illustrated in FIG. 7 instead of the second control process illustrated in FIG. 4.

Seventh Control Process

Figure 9:
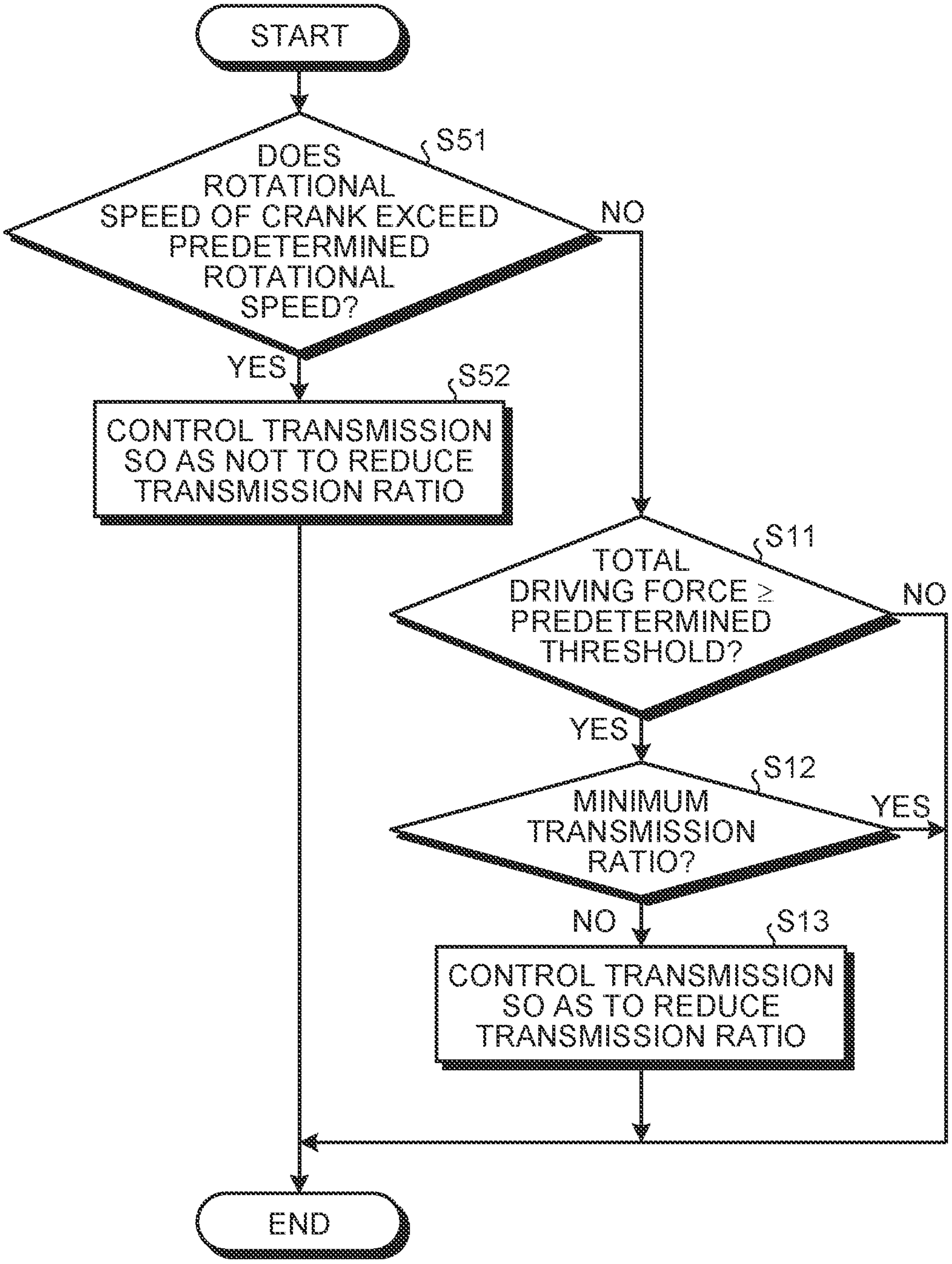
FIG. 9 is a flowchart illustrating one example of a seventh control process executed by the electronic controller according to the embodiment.

In a case where a rotational speed of the crank 24 exceeds a predetermined rotational speed, the electronic controller 52 controls the transmission 42 so as not to reduce a transmission ratio. In a process for controlling an electric component in accordance with a driving force, the electronic controller 52 can execute a seventh control process illustrated in FIG. 9 instead of the second to the sixth control processes. In a process for controlling an electric component in accordance with a driving force, the electronic controller 52 can execute the seventh control process illustrated in FIG. 9 in addition to the sixth control process. If starting the seventh control process, in Step S51, the electronic controller 52 determines whether or not a rotational speed of the crank 24 exceeds a predetermined rotational speed. Next, the electronic controller 52 ends the seventh control process. The predetermined rotational speed is equal to an upper-limit cadence threshold, for example. In a case where a rotational speed of the crank 24 does not exceed the predetermined rotational speed, the electronic controller 52 executes the first control process illustrated in FIG. 4, and ends the seventh control process.

In a case where a rotational speed of the crank 24 does not exceed the predetermined rotational speed, the electronic controller 52 can executes the third control process illustrated in FIG. 5, the fourth control process illustrated in FIG. 6, or the fifth control process illustrated in FIG. 7 instead of the second control process illustrated in FIG. 4.

Eighth Control Process

Figure 10:
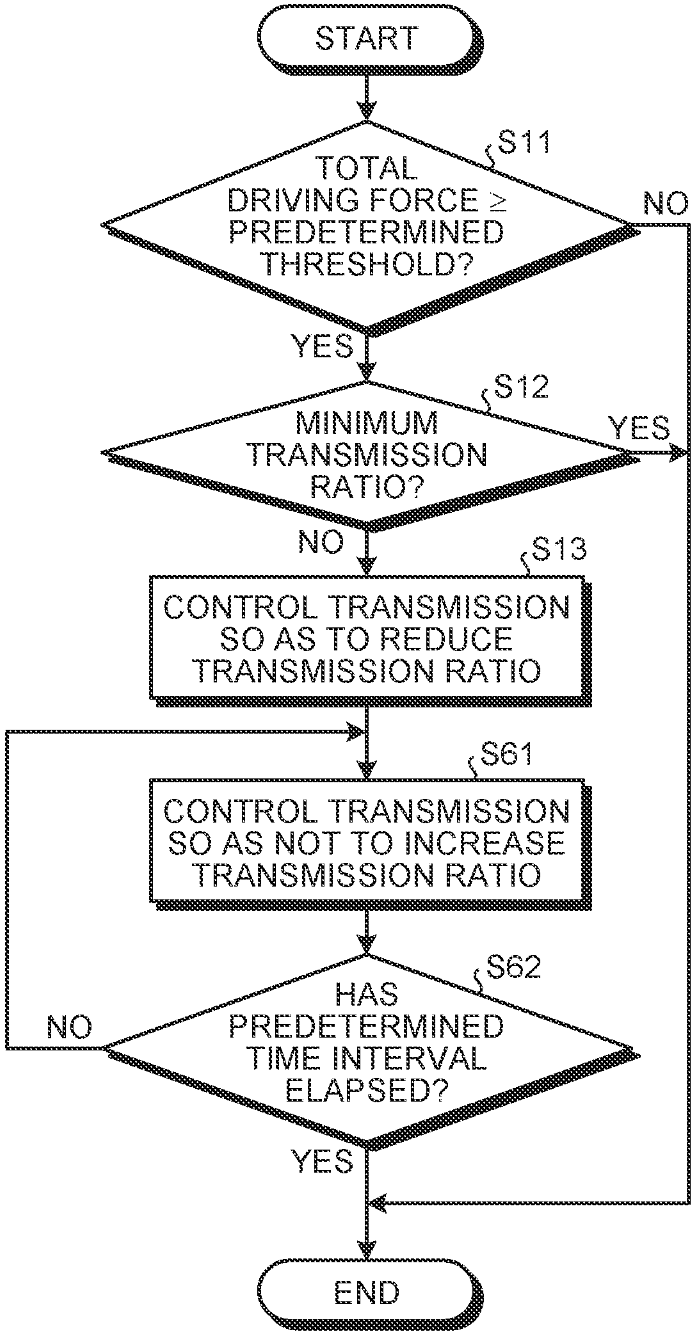
FIG. 10 is a flowchart illustrating one example of an eighth control process executed by the electronic controller according to the embodiment.

The electronic controller 52 can control the transmission 42 so as to reduce a transmission ratio, and then can control the transmission 42 so as not to increase a transmission ratio until a predetermined time interval has elapsed. In a process for controlling an electric component in accordance with a driving force, the electronic controller 52 can execute an eighth control process illustrated in FIG. 10 instead of the second to the seventh control processes. In a process for controlling an electric component in accordance with a driving force, the electronic controller 52 can execute the eighth control process illustrated in FIG. 10 in addition to at least one of the sixth control process and the seventh control process. If starting the eighth control process, in Step S11, the electronic controller 52 determines whether or not a total driving force is equal to or more than a predetermined threshold. In a case where a total driving force is not equal to or more than a predetermined threshold, the electronic controller 52 ends the eighth control process.

In a case where a total driving force is equal to or more than a predetermined threshold, in Step S12, the electronic controller 52 determines whether or not a transmission ratio of the transmission 42 is the minimum transmission ratio. In a case where a transmission ratio of the transmission 42 is the minimum transmission ratio, the electronic controller 52 ends the eighth control process. In a case where a transmission ratio of the transmission 42 is not the minimum transmission ratio, in Step S13, the electronic controller 52 controls the transmission 42 so as to reduce a transmission ratio.

Next, the electronic controller 52 controls in Step S61 the transmission 42 so as not to increase a transmission ratio, and further determines in Step S62 whether or not a predetermined time interval has elapsed. In a case where the predetermined time interval has elapsed, the electronic controller 52 ends the eighth control process. For example, the predetermined time interval is a time interval within a range equal to or more than two seconds and equal to or less than ten seconds.

The electronic controller 52 can execute the processes from Step S21 to Step S23 illustrated in FIG. 5 and from Step S31 to Step S33 illustrated in FIG. 6 or the processes from Step S11 to Step S33, Step S21, and Step S31 illustrated in FIG. 7 instead of the processes from Step S11 to Step S13 in the eighth control process. The electronic controller 52 can execute at least one of the sixth control process and the seventh control process instead of the processes from Step S11 to Step S13 in the eighth control process. The electronic controller 52 can ends the process of Step S7 illustrated in FIG. 3, and then can additionally execute the processes of Step S61 and Step S62. The electronic controller 52 can ends the process of Step S10 illustrated in FIG. 3, and then can additionally execute the processes of Step S61 and Step S62.

Ninth Control Process

In a case where a total driving force is equal to or more than a predetermined threshold, the electronic controller 52 can control the rear suspension 46 so as to increase an initial length of the rear suspension 46. In a process for controlling an electric component in accordance with a driving force, the electronic controller 52 can execute a ninth control process illustrated in FIG. 11 instead of the second to the eighth control processes. In a process for controlling an electric component in accordance with a driving force, the electronic controller 52 can execute the ninth control process in addition to the second control process, the third control process, the fourth control process, the fifth control process, the sixth control process, the seventh control process, or the eighth control process.

If starting the ninth control process, in Step S71, the electronic controller 52 determines whether or not a total driving force is equal to or more than a predetermined threshold. In a case where a total driving force is not equal to or more than a predetermined threshold, the electronic controller 52 ends the ninth control process.

In a case where a total driving force is equal to or more than a predetermined threshold, in Step S72, the electronic controller 52 determines whether or not an initial length of the rear suspension 46 is the maximum. In a case where an initial length of the rear suspension 46 is the maximum, the electronic controller 52 ends the ninth control process. In a case where an initial length of the rear suspension 46 is not the maximum, in Step S73, the electronic controller 52 controls the rear suspension 46 so as to increase an initial length of the rear suspension 46, and ends the ninth control process.

Figure 11:
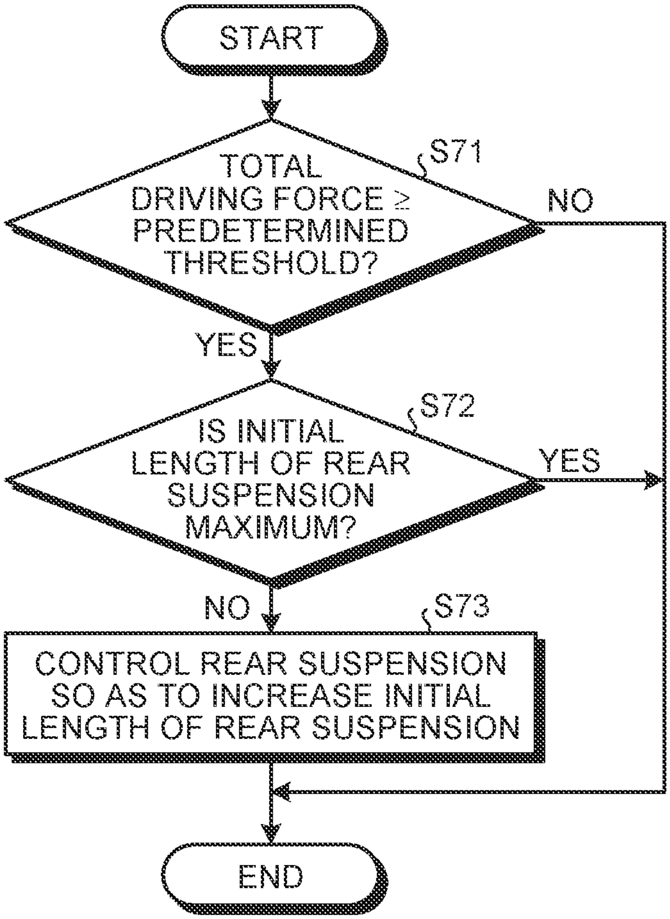
FIG. 11 is a flowchart illustrating one example of a ninth control process executed by the electronic controller according to the embodiment.

The electronic controller 52 can omit the determination process of Step S72. In a case where the determination process of Step S12 is omitted, if determination result Step S71 illustrated in FIG. 11 is Yes, the electronic controller 52 executes the process of Step S73.

Tenth Control Process

In a case where a total driving force is equal to or more than a predetermined threshold, the electronic controller 52 can control the rear suspension 46 so as to increase hardness of the rear suspension 46. In a process for controlling an electric component in accordance with a driving force, the electronic controller 52 can execute a tenth control process illustrated in FIG. 12 instead of the second to the ninth control processes. In a process for controlling an electric component in accordance with a driving force, the electronic controller 52 can execute the tenth control process in addition to the second control process, the third control process, the fourth control process, the fifth control process, the sixth control process, the seventh control process, the eighth control process, or the ninth control process.

In a process for controlling an electric component in accordance with a driving force, the electronic controller 52 can execute the tenth control process in addition to the second control process, the third control process, the fourth control process, the fifth control process, the sixth control process, the seventh control process, the eighth control process, or the ninth control process. If starting the tenth control process, in Step S71, the electronic controller 52 determines whether or not a total driving force is equal to or more than a predetermined threshold. In a case where a total driving force is not equal to or more than a predetermined threshold, the electronic controller 52 ends the tenth control process.

In a case where a total driving force is equal to or more than a predetermined threshold, in Step S74, the electronic controller 52 determines whether or not hardness of the rear suspension 46 is the maximum. In a case where hardness of the rear suspension 46 is the maximum, the electronic controller 52 ends the tenth control process. In a case where hardness of the rear suspension 46 is not the maximum, in Step S75, the electronic controller 52 controls the rear suspension 46 so as to increase hardness of the rear suspension 46, and ends the tenth control process.

Figure 12:
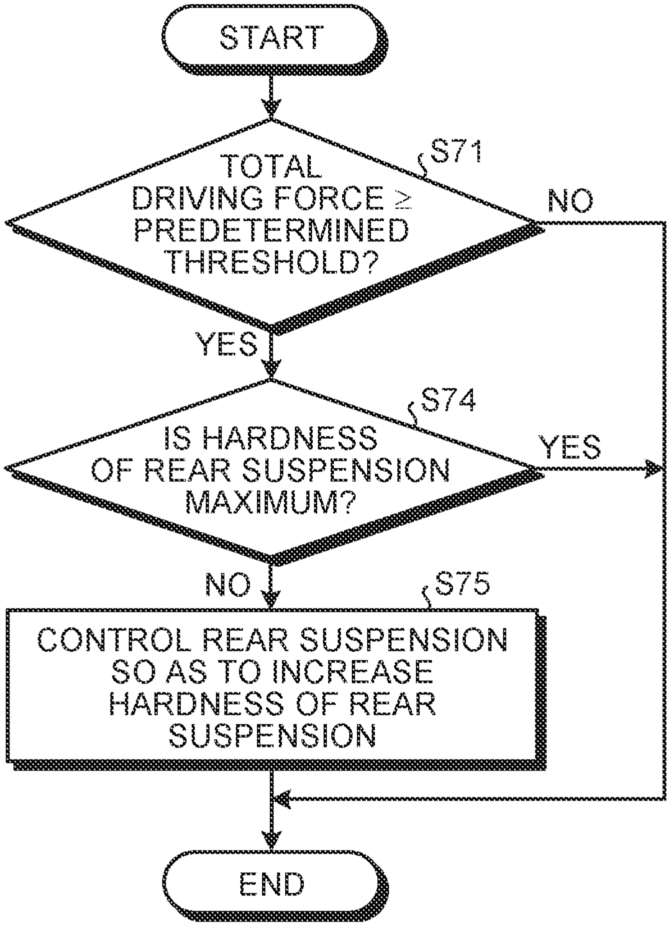
FIG. 12 is a flowchart illustrating one example of a tenth control process executed by the electronic controller according to the embodiment.

The electronic controller 52 can omit the determination process of Step S74. In a case where the determination process of Step S14 is omitted, if determination result in Step S71 illustrated in FIG. 12 is Yes, the electronic controller 52 executes the process of Step S75.

Eleventh Control Process

In a case where a total driving force is equal to or more than a predetermined threshold, the electronic controller 52 can control the rear suspension 46 so as to reduce an initial length of the front suspension 44. In a process for controlling an electric component in accordance with a driving force, the electronic controller 52 can execute an eleventh control process illustrated in FIG. 13 instead of the second to the tenth control processes. In a process for controlling an electric component in accordance with a driving force, the electronic controller 52 can execute the eleventh control process in addition to the second control process, the third control process, the fourth control process, the fifth control process, the sixth control process, the seventh control process, the eighth control process, the ninth control process, or the tenth control process.

In a process for controlling an electric component in accordance with a driving force, the electronic controller 52 can execute the eleventh control process in addition to the second control process, the third control process, the fourth control process, the fifth control process, the sixth control process, the seventh control process, or at least one of the eighth control process, the ninth control process, and the tenth control process. If starting the eleventh control process, in Step S71, the electronic controller 52 determines whether or not a total driving force is equal to or more than a predetermined threshold. In a case where a total driving force is not equal to or more than a predetermined threshold, the electronic controller 52 ends the eleventh control process.

In a case where a total driving force is equal to or more than a predetermined threshold, in Step S76, the electronic controller 52 determines whether or not an initial length of the front suspension 44 is the minimum. In a case where an initial length of the front suspension 44 is the minimum, the electronic controller 52 ends the eleventh control process. In a case where an initial length of the front suspension 44 is not the minimum, in Step S77, the electronic controller 52 controls the front suspension 44 so as to reduce an initial length of the front suspension 44, and ends the eleventh control process.

Figure 13:
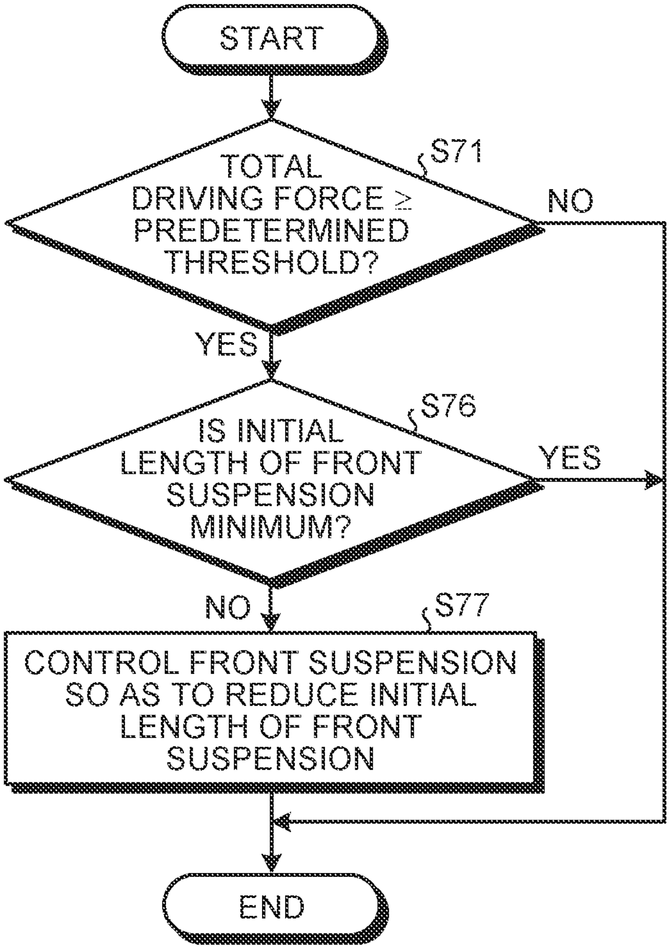
FIG. 13 is a flowchart illustrating one example of an eleventh control process executed by the electronic controller according to the embodiment.

The electronic controller 52 can omit the determination process of Step S76. In a case where the determination process of Step S76 is omitted, if determination result in Step S71 illustrated in FIG. 13 is Yes, the electronic controller 52 executes the process of Step S77.

Twelfth Control Process

In a case where a total driving force is equal to or more than a predetermined threshold, the electronic controller 52 can control the front suspension 44 so as to increase hardness of the front suspension 44. In a process for controlling an electric component in accordance with a driving force, the electronic controller 52 can execute a twelfth control process illustrated in FIG. 14 instead of the second to the eleventh control processes. In a process for controlling an electric component in accordance with a driving force, the electronic controller 52 can execute the twelfth control process in addition to the second control process, the third control process, the fourth control process, the fifth control process, the sixth control process, the seventh control process, the eighth control process, the ninth control process, the tenth control process, or the eleventh control process.

In a process for controlling an electric component in accordance with a driving force, the electronic controller 52 can execute the twelfth control process in addition to the second control process, the third control process, the fourth control process, the fifth control process, the sixth control process, the seventh control process, or at least one of the eighth control process, the ninth control process, the tenth control process, and the eleventh control process. If starting the twelfth control process, in Step S71, the electronic controller 52 determines whether or not a total driving force is equal to or more than a predetermined threshold. In a case where a total driving force is not equal to or more than the predetermined threshold, the electronic controller 52 ends the twelfth control process.

In a case where a total driving force is equal to or more than a predetermined threshold, in Step S78, the electronic controller 52 determines whether or not hardness of the front suspension 44 is the maximum. In a case where hardness of the front suspension 44 is the maximum, the electronic controller 52 ends the twelfth control process. In a case where hardness of the front suspension 44 is not the maximum, in Step S79, the electronic controller 52 controls the front suspension 44 so as to increase hardness of the front suspension 44, and ends the twelfth control process.

Figure 14:
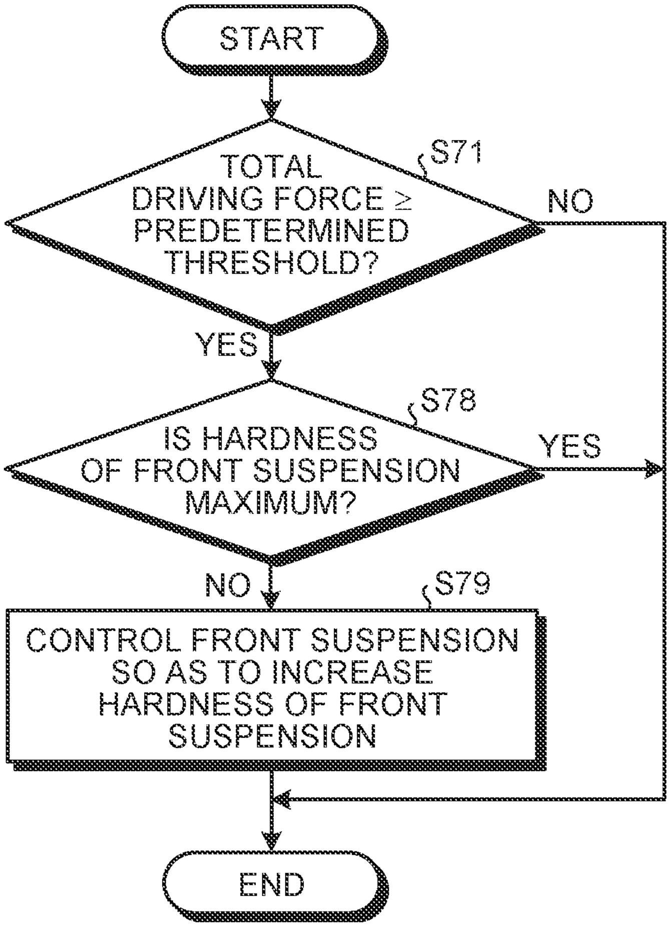
FIG. 14 is a flowchart illustrating one example of a twelfth control process executed by the electronic controller according to the embodiment.

The electronic controller 52 can omit the determination process of Step S78. In a case where the determination process of Step S78 is omitted, if determination result in Step S71 illustrated in FIG. 14 is Yes, the electronic controller 52 executes the process of Step S79.

Thirteenth Control Process

In a case where a total driving force is equal to or more than a predetermined threshold, the electronic controller 52 can control the seat post 48 so as to increase a length of the seat post 48. In a process for controlling an electric component in accordance with a driving force, the electronic controller 52 can execute a thirteenth control process illustrated in FIG. 15 instead of the second to the twelfth control processes. In a process for controlling an electric component in accordance with a driving force, the electronic controller 52 can execute the thirteenth control process in addition to the second control process, the third control process, the fourth control process, the fifth control process, the sixth control process, the seventh control process, the eighth control process, the ninth control process, the tenth control process, the eleventh control process, or the twelfth control process.

The electronic controller 52 can execute the thirteenth control process in addition to the second control process, the third control process, the fourth control process, the fifth control process, the sixth control process, the seventh control process, or the eighth control process, and at least one of the ninth control process, the tenth control process, the eleventh control process, and the twelfth control process. If starting the thirteenth control process, in Step S81, the electronic controller 52 determines whether or not a total driving force is equal to or more than a predetermined threshold. In a case where a total driving force is not equal to or more than the predetermined threshold, the electronic controller 52 ends the thirteenth control process.

In a case where a total driving force is equal to or more than a predetermined threshold, in Step S82, the electronic controller 52 determines whether or not a length of the seat post 48 is the maximum. In a case where a length of the seat post 48 is the maximum, the electronic controller 52 ends the thirteenth control process. In a case where a length of the seat post 48 is not the maximum, in Step S83, the electronic controller 52 controls the seat post 48 so as to increase a length of the seat post 48, and ends the thirteenth control process.

Figure 15:
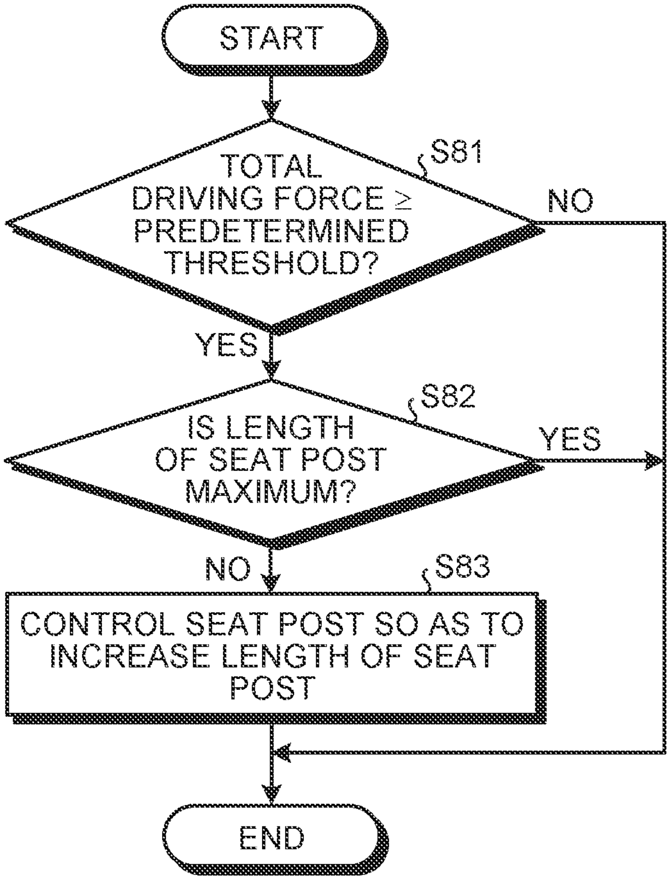
FIG. 15 is a flowchart illustrating one example of a thirteenth control process executed by the electronic controller according to the embodiment.

The electronic controller 52 can omit the determination process of Step S82. In a case where the determination process of Step S82 is omitted, if determination result in Step S81 illustrated in FIG. 15 is Yes, the electronic controller 52 executes the process of Step S83.

Fourteenth Control Process

In a case where a total driving force is equal to or more than a predetermined threshold, the electronic controller 52 control the chain guide 42B so as not to reduce rotational resistance of the chain guide 42B around a predetermined rotational shaft. In a process for controlling an electric component in accordance with a driving force, the electronic controller 52 can execute a fourteenth control process illustrated in FIG. 16 instead of the second to the thirteenth control processes. In a process for controlling an electric component in accordance with a driving force, the electronic controller 52 can execute the fourteenth control process in addition to the second control process, the third control process, the fourth control process, the fifth control process, the sixth control process, the seventh control process, the eighth control process, the ninth control process, the tenth control process, the eleventh control process, the twelfth control process, or the thirteenth control process.

The electronic controller 52 can execute the fourteenth control process in addition to the second control process, the third control process, the fourth control process, the fifth control process, the sixth control process, the seventh control process, the eighth control process, or at least one of the ninth control process, the tenth control process, the eleventh control process, the twelfth control process, and the thirteenth control process. If starting the fourteenth control process, in Step S91, the electronic controller 52 determines whether or not a total driving force is equal to or more than a predetermined threshold. In a case where a total driving force is not equal to or more than the predetermined threshold, the electronic controller 52 ends the fourteenth control process.

In a case where a total driving force is equal to or more than a predetermined threshold, in Step S92, the electronic controller 52 determines whether or not a rotational resistance of the chain guide 42B is the maximum. In a case where a rotational resistance of the chain guide 42B is the maximum, the electronic controller 52 ends the fourteenth control process. In a case where a rotational resistance of the chain guide 42B is not the maximum, in Step S93, the electronic controller 52 controls the chain guide 42B so as not to reduce rotational resistance of the chain guide 42B around a predetermined rotational shaft, and ends the fourteenth control process.

Figure 16:
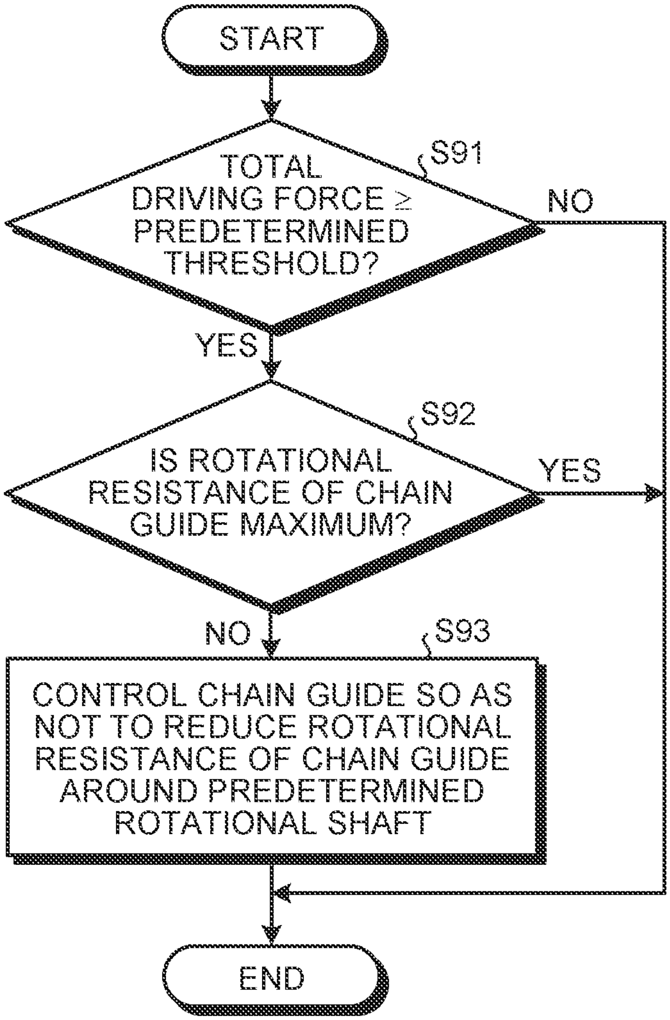
FIG. 16 is a flowchart illustrating one example of a fourteenth control process executed by the electronic controller according to the embodiment.

The electronic controller 52 can omit the determination process of Step S92. In a case where the determination process of Step S92 is omitted, if determination result in Step S91 illustrated in FIG. 16 is Yes, the electronic controller 52 executes the process of Step S93.

It is sufficient that the electric component 20 includes at least one of the transmission 42, the front suspension 44, the rear suspension 46, the seat post 48, and the chain guide 42B. At least one, which is unnecessary for the control, of the vehicle-speed sensor 62, the crank rotation sensor 64, and the acceleration sensor 66 can be omitted from the human-powered vehicle 10. Among from information related to a traveling speed of the human-powered vehicle 10, information related to a rotational speed of the crank 24, and information related to an acceleration in an advancing direction of the human-powered vehicle 10, the traveling state information can include only information necessary for the control, and can exclude therefrom information unnecessary for the control. The human-powered vehicle control device 40 may not control the electric motor 32. The human-powered vehicle control device 40 may be provided in the electric component 20. The human-powered vehicle control device 40 may be provided in at least one of the transmission 42, the front suspension 44, the rear suspension 46, the seat post 48, and the chain guide 42B.

The expression of "at least one" described in this specification means "one or more" desired choices. The expression of "at least one" described in this specification means, as one example, "one choice alone" or "both of two choices" when there preset two choices. The expression of "at least one" described in this specification means, as another example, "one choice alone" or "combination of two or more arbitrary choices" when the number of choices is equal to or more than three.

What is claimed is:

1. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the electric component including a transmission, the electronic controller being configured to control the transmission to reduce a transmission ratio in an automatic transmission mode in response to a determination that the total driving force is equal to or more than the predetermined threshold, the predetermined threshold being a predetermined torque or power, and the transmission ratio being a ratio of a first rotational speed of an output part of the transmission to a second rotational speed of an input part of the transmission.

2. The human-powered vehicle control device according to claim 1, wherein the electronic controller is further configured to have a plurality of operation states whose maximum values of the assistance force by the motor are different from each other, and the predetermined threshold is different for each of the plurality of operation states.

3. The human-powered vehicle control device according to claim 1, wherein the electronic controller is further configured to control the transmission such that a transmission ratio of the transmission reduces upon determining a peak value of the total driving force changes from increasing to decreasing is continuously equal to or more than the predetermined threshold for a predetermined first number of times.

4. The human-powered vehicle control device according to claim 1, wherein the electronic controller is further configured to periodically acquire information related to an acceleration in an advancing direction of the human-powered vehicle, and the electronic controller is further configured to control the transmission such that a transmission ratio of the transmission reduces upon determining the acceleration in the advancing direction of the human-powered vehicle does not continuously increase for a predetermined second number of times.

5. The human-powered vehicle control device according to claim 1, wherein the electronic controller is further configured to control the transmission such that the transmission ratio does not reduce in accordance with the total driving force upon determining a traveling velocity of the human-powered vehicle is outside of a predetermined range.

6. The human-powered vehicle control device according to claim 1, wherein the human-powered vehicle includes a crank into which the human-power driving force is input, and the electronic controller is further configured to control the transmission such that the transmission ratio does not reduce upon determining a rotational speed of the crank exceeds a predetermined rotational speed.

7. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the electric component including a transmission, the electronic controller being configured to control the transmission to reduce a transmission ratio in an automatic transmission mode in response to a determination that the total driving force is equal to or more than the predetermined threshold, the predetermined threshold being a predetermined torque or power, and the electronic controller being further configured to control the transmission such that the transmission ratio does not increase until a predetermined time interval has elapsed after controlling the transmission such that the transmission ratio reduces.

8. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the electric component including a transmission and at least one of a front suspension and a rear suspension, the electronic controller being configured to control the transmission to reduce a transmission ratio in an automatic transmission mode in response to a determination that the total driving force is equal to or more than the predetermined threshold, and the predetermined threshold being a predetermined torque or power.

9. The human-powered vehicle control device according to claim 8, wherein the electronic controller is further configured to control the front suspension such that an initial length of the front suspension reduces upon determining the total driving force is equal to or more than the predetermined threshold.

10. The human-powered vehicle control device according to claim 8, wherein the electronic controller is further configured to control the front suspension such that a hardness of the front suspension increases upon determining the total driving force is equal to or more than the predetermined threshold.

11. The human-powered vehicle control device according to claim 8, wherein the electronic controller is further configured to control the rear suspension such that a hardness of the rear suspension increases upon determining the total driving force is equal to or more than the predetermined threshold.

12. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the electric component including at least one of a front suspension and a rear suspension, and the electronic controller being configured to control the rear suspension such that an initial length of the rear suspension increases upon determining the total driving force is equal to or more than the predetermined threshold.

13. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the electric component including a transmission and an adjustable seatpost, the electronic controller being configured to control the transmission to reduce a transmission ratio in an automatic transmission mode in response to a determination that the total driving force is equal to or more than the predetermined threshold, the predetermined threshold being a predetermined torque or power, and the electronic controller being further configured to control the adjustable seat post such that a length of the adjustable seat post increases upon determining the total driving force is equal to or more than the predetermined threshold.

14. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the drive train of the human-powered vehicle including a chain, the electric component including a chain guide that is configured to guide the chain, the chain guide being provided to be rotatable around a predetermined rotational axis, and the electronic controller being configured to control the chain guide such that a rotational resistance of the chain guide around the predetermined rotational axis reduces upon determining that the total driving force is equal to or more than the predetermined threshold.

15. A human-powered vehicle control device of a human-powered vehicle comprising:

an electronic controller configured to control an electric component that is provided in the human-powered vehicle, in accordance with a total driving force including a human-power driving force applied to a drive train of the human-powered vehicle and an assistance force by a motor providing a propelling force to the human-powered vehicle, the electric component being different from the motor, the electronic controller being configured to control the motor in accordance with the total driving force and a predetermined threshold, the drive train of the human-powered vehicle including a chain, the electric component including a chain guide that is configured to guide the chain, the chain guide being provided to be rotatable around a predetermined rotational axis, the electronic controller being configured to control the chain guide such that a rotational resistance of the chain guide around the predetermined rotational axis reduces upon determining that the total driving force is equal to or more than the predetermined threshold, and the electric component including a derailleur that includes the chain guide.

* * * * *